(12) United States Patent
Buck et al.

(10) Patent No.: US 7,531,270 B2
(45) Date of Patent: May 12, 2009

(54) BATTERY PACK WITH INTEGRAL COOLING AND BUSSING DEVICES

(75) Inventors: Derrick Scott Buck, Pendleton, IN (US); Robert N. Fattig, Anderson, IN (US); Bruce J. Silk, Boca Raton, FL (US)

(73) Assignee: Enerdel, Inc., Indianapolis, IN (US)

( * ) Notice: Subject to any disclaimer, the term of this patent is extended or adjusted under 35 U.S.C. 154(b) by 21 days.

(21) Appl. No.: 11/748,690

(22) Filed: May 15, 2007

(65) Prior Publication Data

US 2008/0090137 A1 Apr. 17, 2008

Related U.S. Application Data

(60) Provisional application No. 60/851,684, filed on Oct. 13, 2006, provisional application No. 60/855,787, filed on Nov. 1, 2006, provisional application No. 60/922,632, filed on Apr. 10, 2007.

(51) Int. Cl.
*H01M 10/50* (2006.01)
*H01M 2/10* (2006.01)
*H01M 10/38* (2006.01)
*H01M 6/46* (2006.01)

(52) U.S. Cl. .................. 429/120; 429/99; 429/100; 429/123; 429/153

(58) Field of Classification Search ............. 429/120, 429/99, 100, 123, 151–154; 29/730–731, 29/623.1–623.5
See application file for complete search history.

(56) References Cited

U.S. PATENT DOCUMENTS

| | | | |
|---|---|---|---|
| 3,686,530 A | 8/1972 | Bogut | |
| 4,347,294 A | 8/1982 | Mejia | |
| 4,680,242 A | 7/1987 | Simonton et al. | |
| 5,049,457 A | 9/1991 | Niksa et al. | |
| 5,354,630 A | 10/1994 | Earl et al. | |
| 5,378,555 A * | 1/1995 | Waters et al. | 429/97 |
| 5,424,143 A | 6/1995 | Shrim | |
| 5,639,571 A | 6/1997 | Waters et al. | |
| 6,117,584 A | 9/2000 | Hoffman et al. | |
| 6,120,935 A | 9/2000 | Van Lerberghe | |
| 6,225,778 B1 | 5/2001 | Hayama et al. | |
| 6,344,728 B1 | 2/2002 | Kouzu et al. | |
| 6,368,743 B1 | 4/2002 | Guerin et al. | |
| 6,709,783 B2 | 3/2004 | Ogata et al. | |
| 6,724,170 B1 | 4/2004 | Maggert et al. | |
| 6,761,992 B1 * | 7/2004 | Marukawa et al. | 429/96 |
| 6,821,671 B2 * | 11/2004 | Hinton et al. | 429/120 |

(Continued)

FOREIGN PATENT DOCUMENTS

JP 09120835 A 5/1997

(Continued)

*Primary Examiner*—Dah-Wei D Yuan
*Assistant Examiner*—Maria J Laios
(74) *Attorney, Agent, or Firm*—Ice Miller LLP

(57) ABSTRACT

A battery module of the present invention is adaptable to be utilized in various configurations including and not limited to an overlapping battery cell packaging configuration and a vertical stack battery cell packaging configuration used in an automotive vehicle. The battery module has a plurality of battery heatsink assemblies with the cells disposed therebetween. A plurality of rods extend through the each heatsink assemblies to secure the heatsink assemblies and the cell with one another to form the battery module.

46 Claims, 16 Drawing Sheets

U.S. PATENT DOCUMENTS

| | | |
|---|---|---|
| 7,190,588 B2 | 3/2007 | Lee et al. |
| 2002/0045096 A1 | 4/2002 | Sandberg et al. |
| 2002/0177035 A1* | 11/2002 | Oweis et al. ............... 429/120 |
| 2003/0211384 A1 | 11/2003 | Hamada et al. |
| 2004/0115519 A1 | 6/2004 | Lee |
| 2004/0265687 A1 | 12/2004 | Chan et al. |
| 2005/0123828 A1 | 6/2005 | Oogami et al. |
| 2005/0202311 A1 | 9/2005 | Higashino et al. |
| 2005/0271934 A1 | 12/2005 | Kiger et al. |
| 2006/0177733 A1* | 8/2006 | Ha et al. ..................... 429/159 |
| 2007/0037051 A1 | 2/2007 | Kim et al. |
| 2007/0252556 A1* | 11/2007 | West et al. .................. 320/116 |

FOREIGN PATENT DOCUMENTS

| | | |
|---|---|---|
| KR | 2001-0037119 A | 5/2001 |
| KR | 2001-0037119 A1 | 5/2001 |

\* cited by examiner

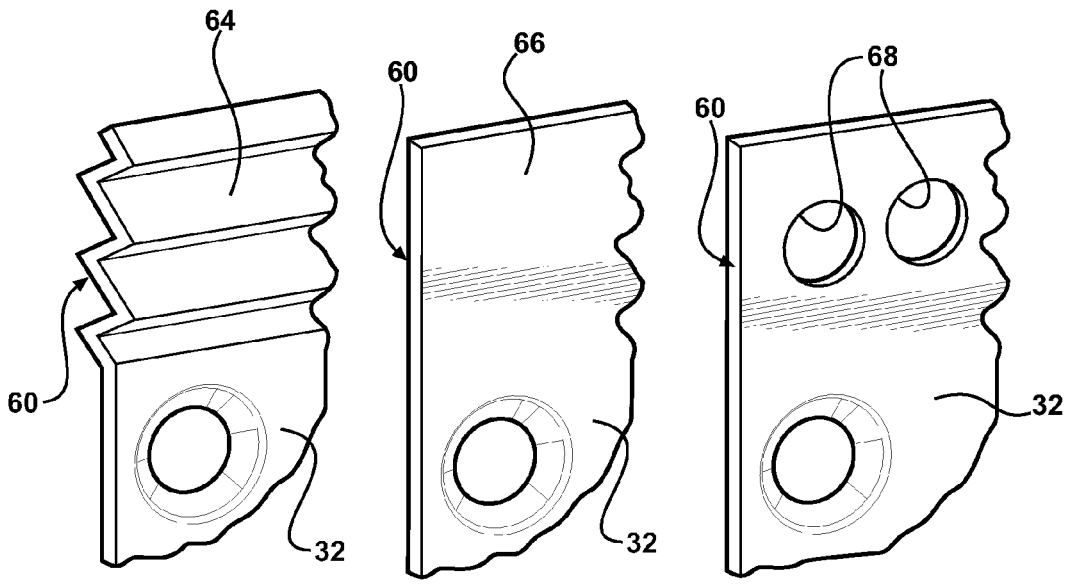
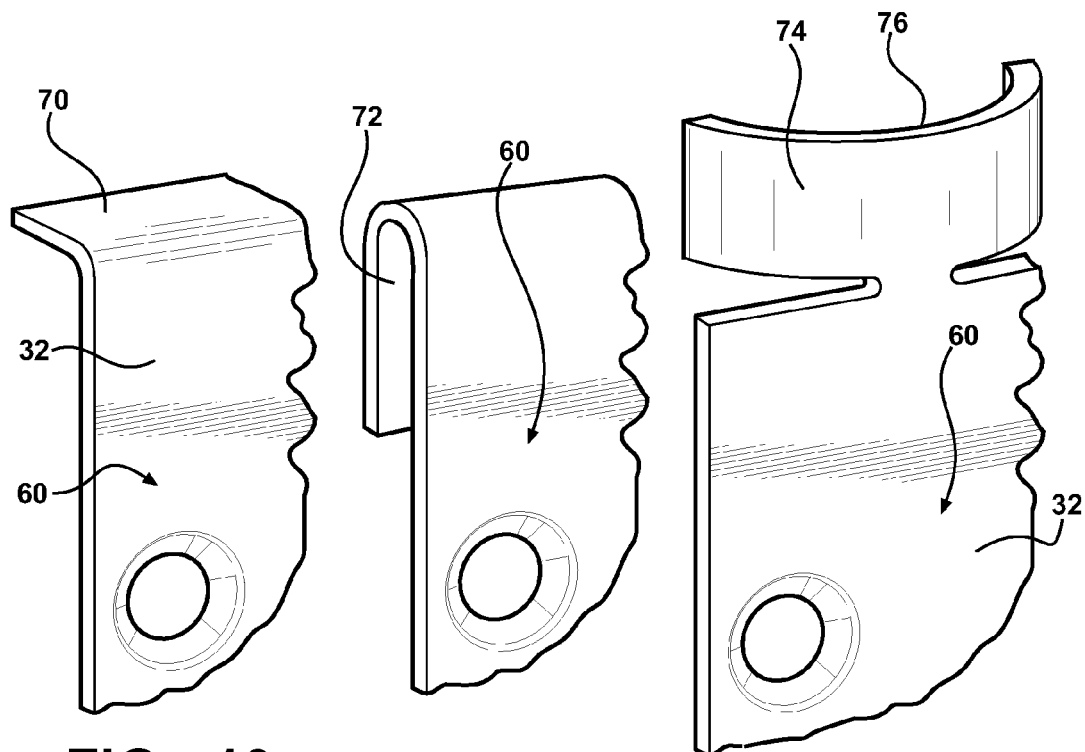

BATTERY PACK WITH INTEGRAL COOLING AND BUSSING DEVICES

RELATED APPLICATIONS

This non-provisional application claims priority to provisional application Ser. Nos. 60/851,684 filed on Oct. 13, 2006, and 60/855,787 filed on Nov. 1, 2006, and 60/922,632 filed on Apr. 10, 2007, and incorporated by reference herein in its entirety.

FIELD OF THE INVENTION

The subject invention relates to battery packs having cells and more particularly, to a battery pack for electric/hybrid vehicles having a cooling system or a heating system for cooling the cells within the battery pack.

BACKGROUND OF THE INVENTION

Motor vehicles, such as, for example, hybrid vehicles use multiple propulsion systems to provide motive power. This most commonly refers to gasoline-electric hybrid vehicles, which use gasoline (petrol) to power internal-combustion engines (ICEs), and electric batteries to power electric motors. These hybrid vehicles recharge their batteries by capturing kinetic energy via regenerative braking. When cruising or idling, some of the output of the combustion engine is fed to a generator (merely the electric motor(s) running in generator mode), which produces electricity to charge the batteries. This contrasts with all-electric cars which use batteries charged by an external source such as the grid, or a range extending trailer. Nearly all hybrid vehicles still require gasoline as their sole fuel source though diesel and other fuels such as ethanol or plant based oils have also seen occasional use.

Batteries and cells are important energy storage devices well known in the art. The batteries and cells typically comprise electrodes and an ion conducting electrolyte positioned therebetween. Battery packs that contain lithium ion batteries are increasingly popular with automotive applications and various commercial electronic devices because they are rechargeable and have no memory effect. Storing and operating the lithium ion battery at an optimal operating temperature is very important to allow the battery to maintain a charge for an extended period of time.

Due to the characteristics of the lithium ion batteries, the battery pack operates within an ambient temperature range of $-20°$ C. to $60°$ C. However, even when operating within this temperature range, the battery pack may begin to lose its capacity or ability to change or discharge should the ambient temperature fall below $0°$ C. Depending on the ambient temperature, the life cycle capacity or charge/discharge capability of the battery may be greatly reduced as the temperature strays from $0°$ C. Nonetheless, it may be unavoidable that the lithium ion battery be used where the ambient temperature falls outside the temperature range.

Alluding to the above, significant temperature variances can occur from one cell to the next, which is detrimental to performance of the battery pack. To promote long life of the entire battery pack, the cells must be below a desired threshold temperature. To promote pack performance, the differential temperature between the cells in the battery pack should be minimized. However, depending on the thermal path to ambient, different cells will reach different temperatures. Further, for the same reasons, different cells reach different temperatures during the charging process. Accordingly, if one cell is at an increased temperature with respect to the other cells, its charge or discharge efficiency will be different, and, therefore, it may charge or discharge faster than the other cells. This will lead to decline in the performance of the entire pack.

The art is replete with various designs of the battery packs with cooling systems. The U.S. Pat. No. 5,071,652 to Jones et al. teaches a metal oxide-hydrogen battery including an outer pressure vessel of circular configuration that contains a plurality of circular cell modules disposed in side-by-side relations. Adjacent cell modules are separated by circular heat transfer members that transfer heat from the cell modules to the outer vessel. Each heat transfer member includes a generally flat body or fin which is disposed between adjacent cell modules. A peripheral flange is located in contact with the inner surface of the pressure vessel. The width of each cell module is greater than the length of the flange so that the flange of each heat transfer member is out of contact with the adjacent heat transfer member. The flanges are constructed and arranged to exert an outward radial force against the pressure vessel. Tie bars serve to clamp the cell modules and heat transfer members together in the form of a stack which is inserted into the pressure vessel.

The metal oxide-hydrogen battery taught by the U.S. Pat. No. 5,071,652 to Jones et al. is designed for cylindrical type of batteries and teaches the heat transfer members in direct contact with the vessel thereby failing to create a clearance between the vessel and the heat transfer members, which can be used to introduce cooling or heating agent to cool or heat the cells.

The U.S. Pat. No. 5,354,630 to Earl et al. teaches a common pressure vessel of a circular configuration type Ni—H.sub.2 storage battery having an outer pressure vessel that contains a stack of compartments. Each of the compartments includes at least one battery cell, a heat transfer member, and a cell spacer for maintaining a relatively constant distance between adjacent compartments. The heat transfer members include a fin portion, which is in thermal contact with the battery cell, and a flange portion which extends longitudinally from the fin portion and is in tight thermal contact with the inner wall of the pressure vessel. The heat transfer member serves to transfer heat generated from a battery cell radially to the pressure vessel.

Similarly to the metal oxide-hydrogen battery taught by the U.S. Pat. No. 5,071,652 to Jones et al., the storage battery taught by the U.S. Pat. No. 5,354,630 to Earl et al. is designed for cylindrical type of batteries. This metal oxide-hydrogen battery teaches the heat transfer members being in direct contact with the vessel thereby failing to create a clearance between the vessel and the heat transfer members which can be used to introduce cooling or heating agent to cool or heat the cells.

The U.S. Pat. No. 6,117,584 to Hoffman et al. teaches a thermal conductor for use with an electrochemical energy storage device. The thermal conductor is attached to one or both of the anode and cathode contacts of an electrochemical cell. A resilient portion of the conductor varies in height or position to maintain contact between the conductor and an adjacent wall structure of a containment vessel in response to relative movement between the conductor and the wall structure. The thermal conductor conducts current into and out of the electrochemical cell and conducts thermal energy between the electrochemical cell and thermally conductive and electrically resistive material disposed between the conductor and the wall structure. The thermal conductor taught by the U.S. Pat. No. 6,117,584 to Hoffman et al. is attached to one or both of the anode and cathode contacts of the cell and not between the cells.

The U.S. Pat. No. 6,709,783 to Ogata et al. teaches a battery pack having a plurality of prismatic flat battery modules constituted by nickel metal hydride batteries, arranged parallel to each other. Each battery module consists of an integral case formed by mutually integrally connecting a plurality of prismatic battery cases having short side faces and long side faces, the short side faces constituting partitions between adjacent battery cases and being shared. A plurality spacers are made of a sheet bent in opposite directions such that alternately protruding grooves or ridges respectively contact the opposite long side faces of the battery modules for providing cooling passages between the battery modules. The battery pack taught by the U.S. Pat. No. 6,709,783 to Ogata et al. is intended to define voids, i.e. the cooling passages between the cells thereby diminishing the packaging characteristics of the pack.

The U.S. Pat. No. 6,821,671 to Hinton et al. teaches an apparatus for cooling battery cells. As shown in FIG. 1 of the U.S. Pat. No. 6,821,671 to Hinton et al., a cooling fin is connected to the battery cell having railings for holding the cooling fin as each cooling fin slides between the railings thereby fitting the cooling fin within the respective battery cell thereby forming the aforementioned apparatus. The engagement of the cooling fin with the battery cell is presented in such a manner that the cooling fins do not extend beyond the battery cells. Thus, cooling agent only serves its intended purpose applicable if introduced from the side of the apparatus. If, for example, the cooling agent is applied to the front of the apparatus, only first battery cell is exposed to the cooling agent thereby preventing effective cooling of other battery cells.

Alluding to the above, FIG. 7 of the U.S. Pat. No. 6,821,671 to Hinton et al. shows the apparatus wherein straps are inserted through ears extending from the cooling fins to connect multiple battery cells to form the apparatus and fins together to keep the battery cells in compression. The straps, as shown in FIG. 7 deform the battery cells thereby negatively affecting chemical reaction between electrolyte, cathodes and anodes of each battery cells and resulting in a reduced life span of the cells.

The Japanese publication No. JP2001-229897 teaches a battery pack design and method of forming the same. The purpose of the method is to create the voids between the cells for cool air to go through the voids and between the cells to cool the cells. Similarly to the aforementioned U.S. Pat. No. 6,709,783 to Ogata et al., the battery pack taught by the Japanese publication No. JP2001-229897 is intended to define the voids between the cells thereby diminishing the packaging characteristics of the pack.

Therefore, there remains an opportunity to improve upon the packs of lithium batteries of the prior art to increase the ambient temperature range at which the lithium battery operates and to provide a new battery pack with improved packaging characteristics.

Also, there remains an opportunity to maintain the battery pack at the optimal operating temperature to ensure the longest possible life cycle, rated capacity, and nominal charge and discharge rates.

SUMMARY OF THE INVENTION

A battery module or pack of the present invention is adaptable to be utilized in various configurations including and not limited to a horizontally or vertically stacked battery cell packaging configurations used in an automotive vehicle. The battery pack has a plurality of battery modules each presenting a multitude of cells each sandwiched by respective heatsinks formed from thermally conductive materials such as, for example, flat stock aluminum alloy foils and the like, without limiting the scope of the present invention.

Preferably, each cell is a lithium ion cell having a first current collector and a first electrode adjacent the first current collector and a second current collector and a second electrode of charge opposite from the first electrode and adjacent the second current collector. A separator layer is positioned between the first and second electrodes with the first and second electrodes conducting electrolyte therebetween. The plurality of the first electrodes and the second electrodes are stacked and packaged into an electrical insulating envelope to form a cell. The cell packaging includes side edges and terminal ends. One terminal end includes a first bend extending therefrom in a first direction. Another terminal end includes a second bend extending therefrom in a second direction opposite from the first direction.

The heatsink includes terminal ends, and top and bottom thermal transfer edges. The top and bottom thermal transfer edges may include a plurality of fins integral with and extending from the heatsink. The fins may be cold formed and are designed to transfer heat either to or from the cells depending on application. A pair of electrically insulating spacer devices or ears are mechanically attached on each side of the heatsink. A plurality of studs are molded in to and extend from the spacer on one side of the heatsink while a spacer without the plurality of studs but with relief for a sensor occupies the opposite side to form a heatsink assembly. The cell terminals are folded over the studs in an electrical series or electrical parallel configuration. The cells are disposed between the heatsink assembly.

A plurality of flexible circuit are positioned over the studs for sensing voltage at every series connection. Integral sensors are positioned on the flexible circuit to provide temperature sensing. A nut with integral spring washer is threaded and to provide a torque over each stud for electrical conductivity and mechanical retention. Two end or compression plates are attached to the heatsink assemblies aligned with one another with the cells disposed therebetween.

At least four tie rods extend peripherally through each of the heatsink assemblies and the compression plates thereby placing the entire battery module into a compressive state to promote shorter path length for ion conduction inside the cell and improved thermal transfer of either to or from the heatsink.

A potting material, such as for example, polyurethane, polyurethane foams, silicones or epoxies, is injected into the battery module placed in a case to at least partially or fully encapsulate the battery module and the corresponding cells thereby eliminating air gaps between the cells and the case. The potting material also serves to prevent the electrode stack from shifting inside the cell packaging material during exposure to shock and vibration. The potting material also prevents the cell packaging from relaxing over time and allowing the electrolyte to settle into the base of the cell package and thus reducing the cell's electrical capacity. The potting/encapsulating material also prevents movement of the battery module within the battery pack case.

An advantage of the present invention is to provide a battery module with a very high energy density characteristic, wherein the high energy density is accomplished by assembling cells, power and data bussing devices, controllers, cooling, and retention architecture in the small volume of space thereby improving packaging characteristics and providing a compact product.

Another advantage of the present invention is to provide a battery module having excellent retention that surrounds and secures the cells.

Still another advantage of the present invention is to provide a battery module having excellent retention that surrounds and secures the electrode stack within the cell envelope from shifting.

Still another advantage of the present invention is to provide a battery module encapsulated by the potting material which greatly reduces the potential permeation of liquids into the battery pack, or leakage from inside the battery module to the outside of the battery pack thereby preventing reduced product life or premature failures of the battery module.

Still another advantage of the present invention is to provide a low mass design of a battery pack which includes polyurethane foam as a potential retention device, which is very competitive to that of traditional methods of retention, such as, for example, silicone or epoxy adhesives.

Still another advantage of the present invention is to provide a packaging method which utilizes a case that houses the module that includes a taper filled with an encapsulant which locks the module in position and will allow the pack to be mounted in any orientation.

Still another advantage of the present invention is to provide a battery pack that reduces manufacturing costs due to simplified assembly methods.

Still another advantage of the present invention is to provide a battery pack having a balanced thermal management system wherein each cell of the battery pack receives a similar temperature and flow of thermal management media to assist in the removing or adding heat.

Still another advantage of the present invention is to provide a cooling system which allows the battery pack to deliver and receive high rates of current, i.e. the C-rate by efficiently removing undesired heat during the rapid charge or discharge pulse that may negatively impact the performance and life span of the battery pack.

Still another advantage of the present invention is to provide a heating system which allows the battery pack to operate when exposed to temperatures below the optimal operating range of the cell chemistry.

Still another advantage of the present invention is to provide a pack that is simple in design and has a reduced mass.

The subject invention provides several advantages over the battery packs of the prior art by increasing an ambient temperature range at which the battery pack can operate. Also, the subject invention helps maintain the battery pack at an optimal operating temperature to extend the life cycle of the battery pack, and to increase battery pack safety.

BRIEF DESCRIPTION OF THE DRAWINGS

Other advantages of the present invention will be readily appreciated as the same becomes better understood by reference to the following detailed description when considered in connection with the accompanying drawings wherein:

FIGS. 7 through 12 show fragmental views of alternative thermal transfer edge configurations;

DETAILED DESCRIPTION OF THE PREFERRED EMBODIMENT

Referring to the Figures, wherein like numerals indicate like or corresponding parts, a battery unit or pack of the present invention is adaptable to be utilized in various configurations including and not limited to a horizontally or vertically stacked battery cell packaging configuration used in an automotive vehicle applications. The battery assembly or pack is generally shown at 10 in FIG. 1. The battery assembly 10 includes a plurality of battery modules, each generally shown at 12 in FIGS. 2 and 3.

Figure 13:
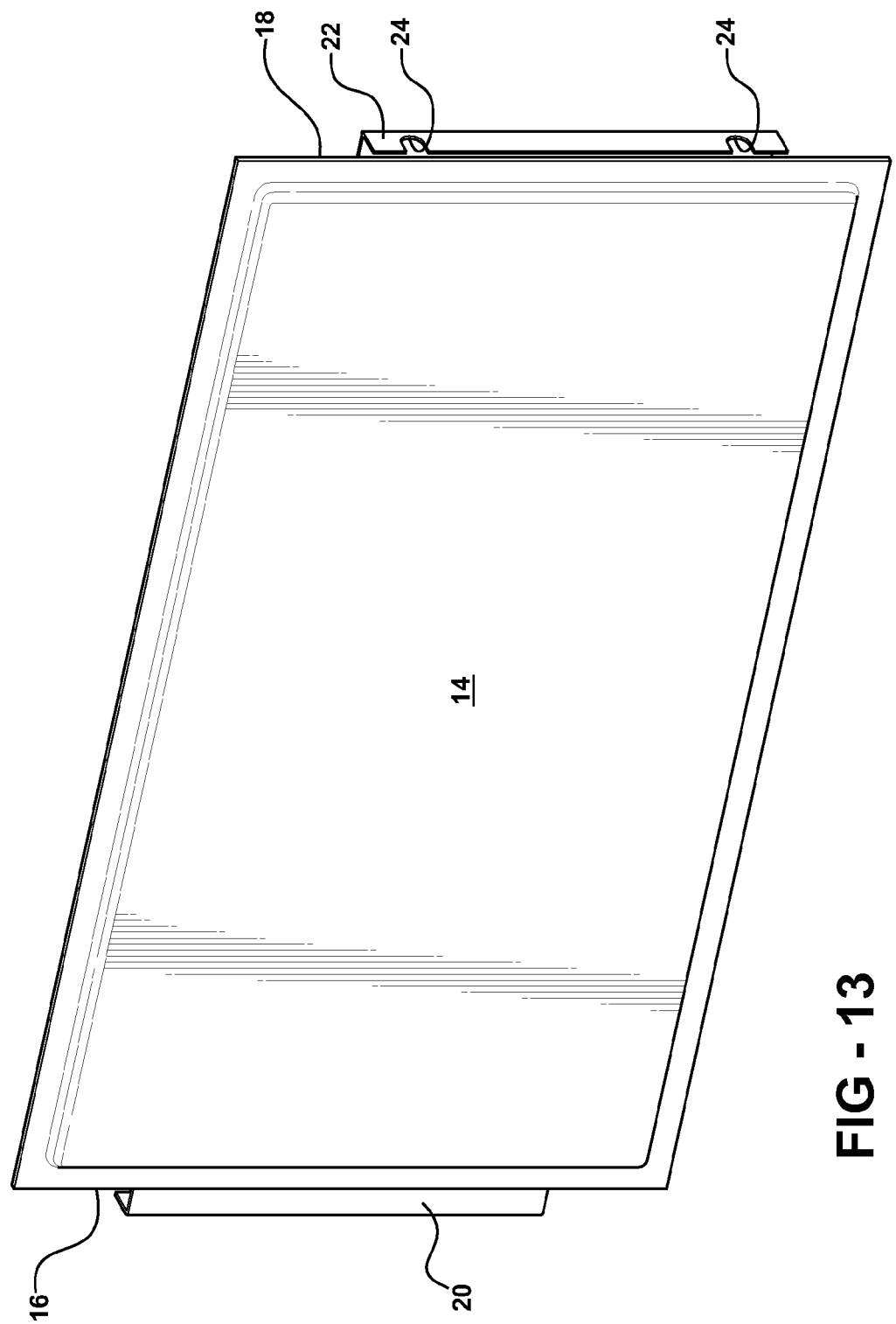
FIG. 13 shows the cell having a pair of terminal bends extending into different directions.

Each battery module 12 includes a plurality of cells, generally indicated at 14 in FIG. 13. Preferably, each cell 14 is a lithium ion cell without limiting the scope of the present invention. Those skilled in the battery art will appreciate that other cells can be utilized with the present invention. Each cell 14 includes a plurality of battery components (not shown) co-acting between one another with electrolyte therebetween as known to those skilled in the lithium battery art. A first electrode is adjacent a first current collector and a second electrode of charge opposite from the first electrode is adjacent a second current collector. A separator layer is positioned between the first and second electrodes with the first and second electrodes with electrolyte therebetween. A plurality of first electrodes and second electrodes are stacked and packaged into an electrical insulating envelope to form a cell.

Figure 14:
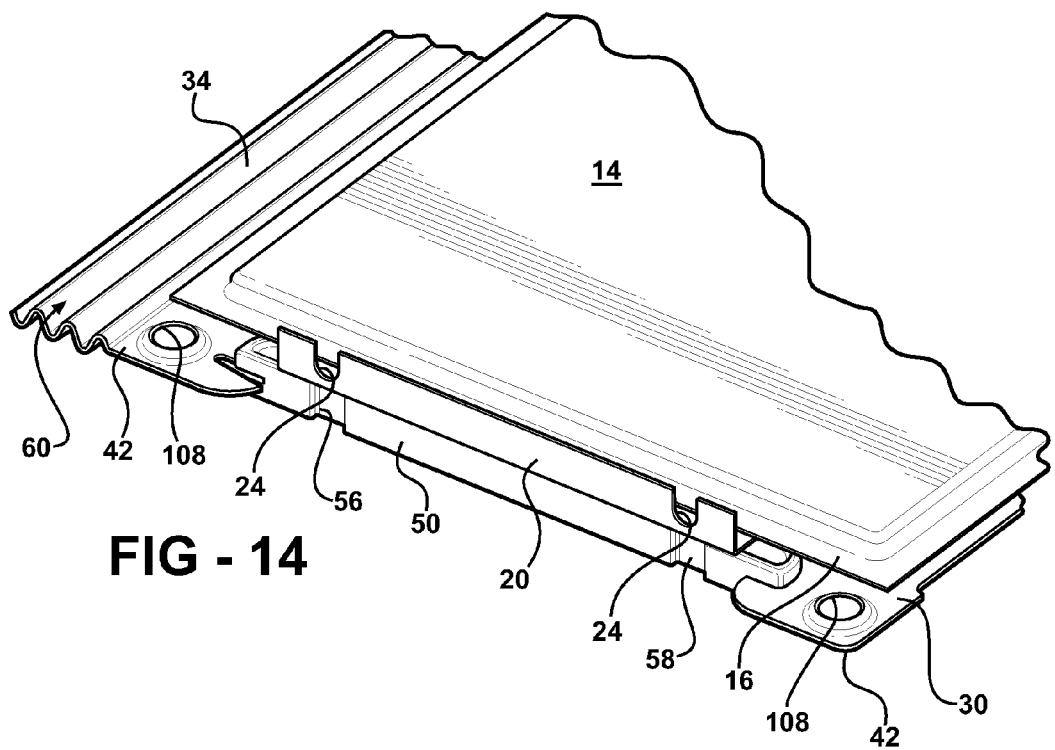
FIG. 14 shows a partial and perspective view of the cell engaging the sensor area of the heatsink assembly.
Figure 15:
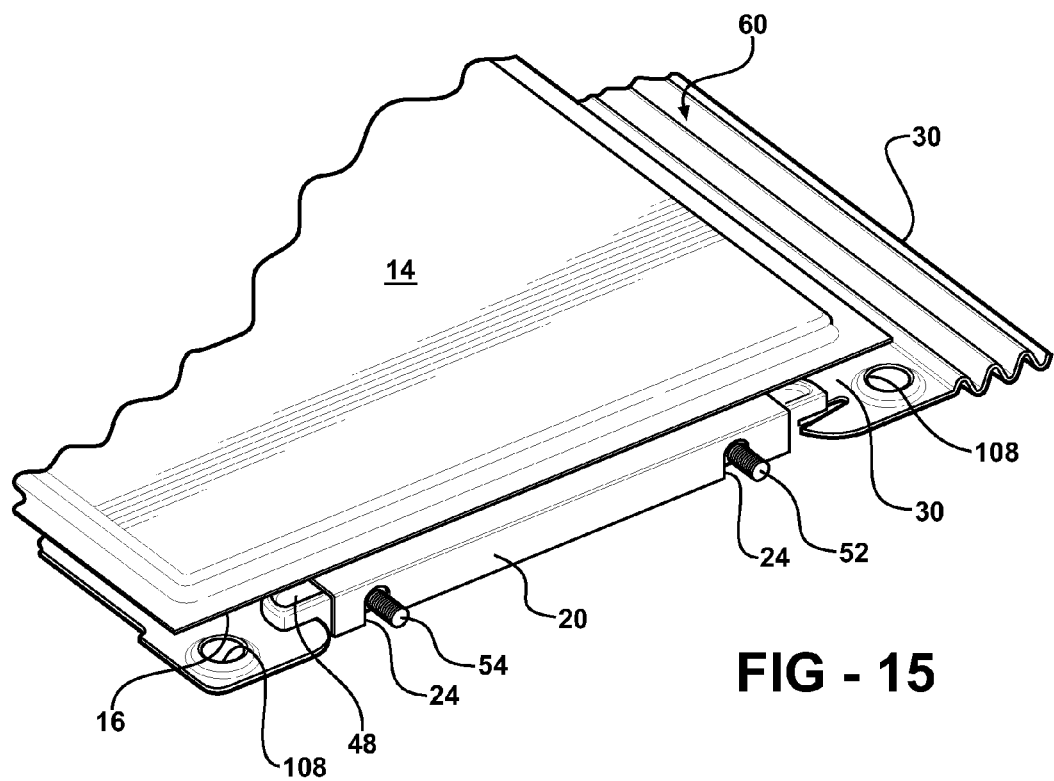
FIG. 15 shows a partial and perspective view of the cell engaging the terminal end of the heatsink assembly.

Alluding to the above, the cell 14 presents side edges 16 and 18. A first bend 20 presents a positive terminal and a second bend 22 presents a negative terminal. Each bend 20 and 22 with a defined angle of at least ninety degrees and up to ninety degrees. Each bend 20 and 22 presents a pair of semicircular openings 24. Alternatively, each bend 20 and 22 may present other openings (not shown). As best shown in FIGS. 13 through 15, the first bend 20 extends in an opposite direction from the second bend 22, i.e. the openings 24 of the first bend 20 face oppositely from the openings 24 of the second bend 22.

Figure 2:
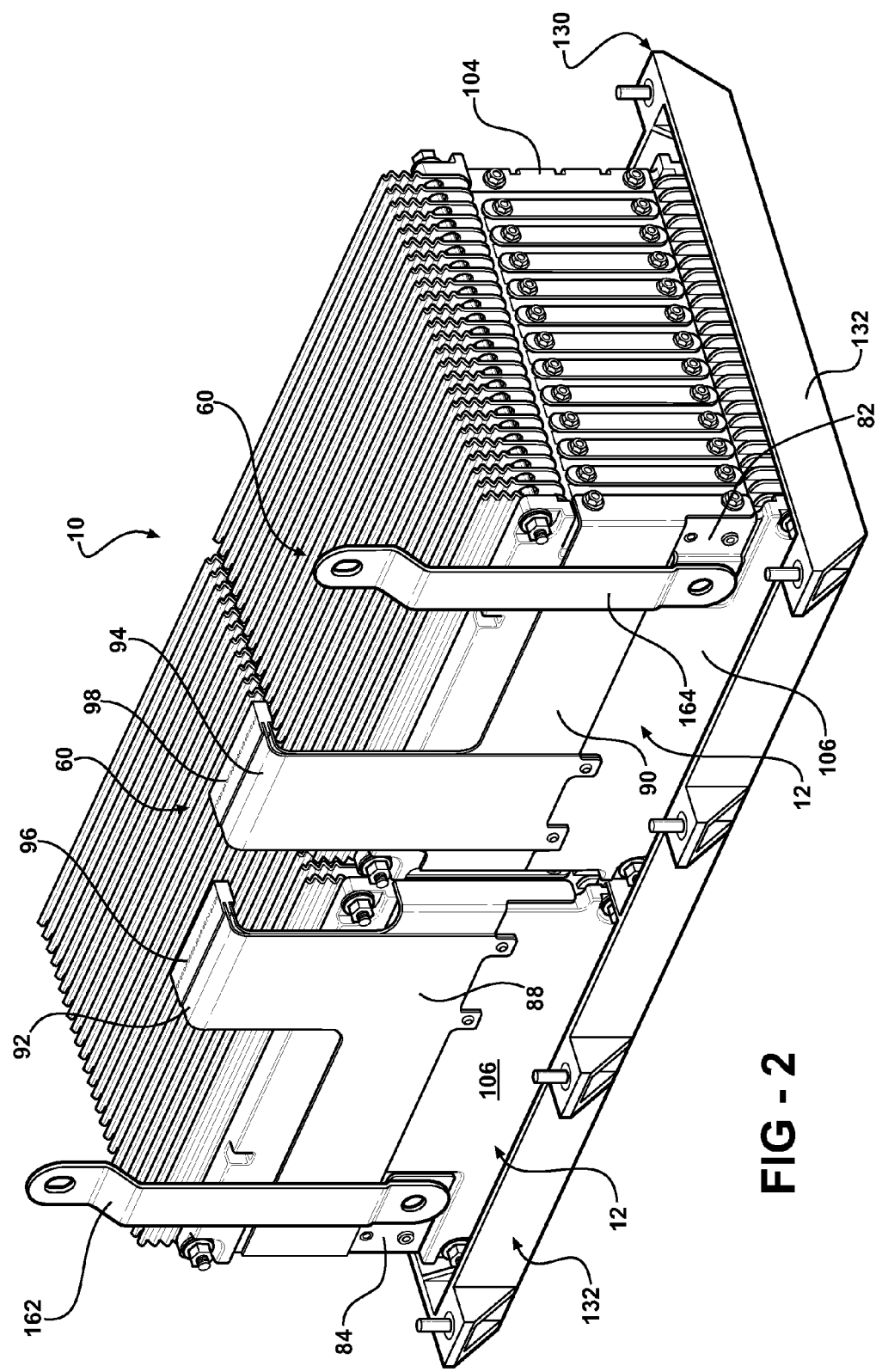
FIG. 2 is another perspective view of the battery pack of FIG. 1 showing two battery modules each presenting the cells sandwiched by heatsink assemblies with each battery module supported by a base of a housing.
Figure 5:
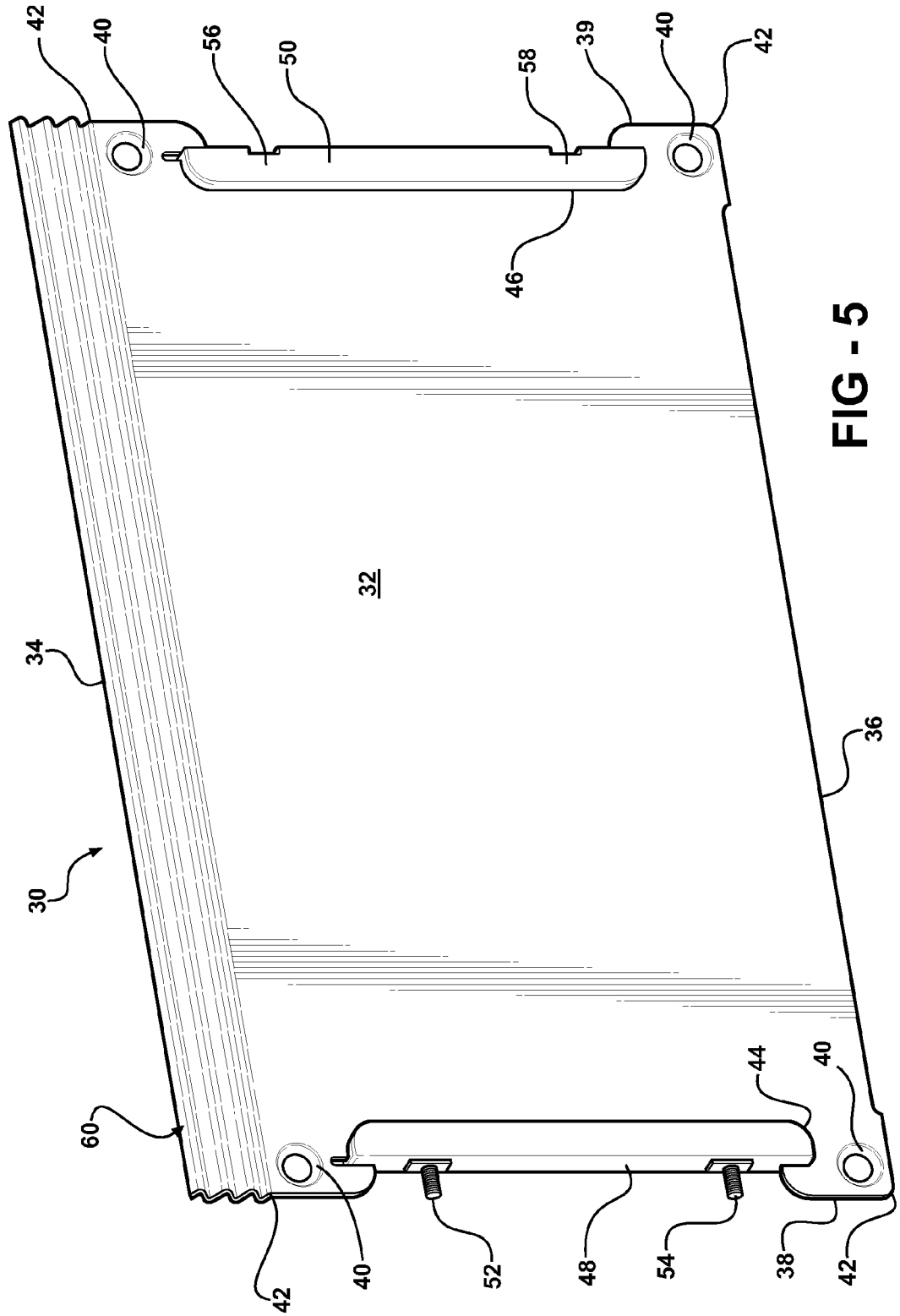
FIG. 5 shows the heatsink assembly of the battery pack.
Figure 6:
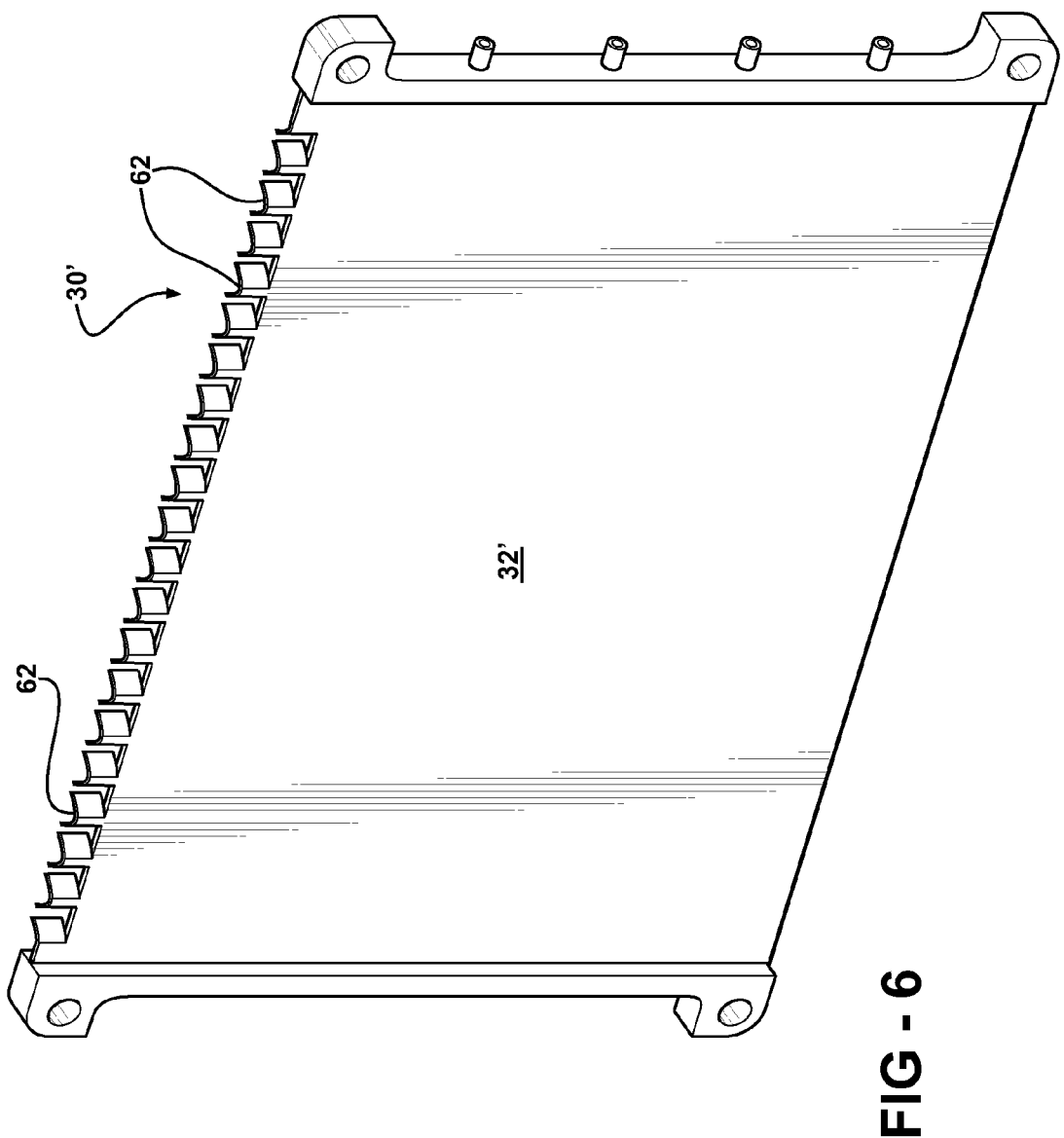
FIG. 6 shows an alternative embodiment of the heatsink assembly.

As best shown in FIG. 2, the battery module 12 includes a plurality of heatsink assemblies, generally shown at 30 in FIG. 5. Each heatsink assembly 30 is formed from a thermally conductive material such as aluminum, copper, and the like, without limiting the scope of the present invention. Each heatsink assembly made of a plate, sheet, or foil 30 presents a thermal transfer face 32 defining top and bottom thermal transfer edges 34 and 36 and terminal ends 38 and 39 interconnected by corners 42. The terminal ends 38 and 39 define cut out portions 44 and 46 to receive spacers 48 and 50 formed from non-conductive polymer or non electrically conductive material without limiting the scope of the present invention. One spacer 48 includes at least two studs 52 and 54 extending therefrom to receive the cell terminal openings 24 of each bend 20 and 22. Opposite the first spacer, the second spacer 50 includes at least a pair of concave features 56 and 58 to receive sensors (not shown) to monitor cell 14 temperatures. FIG. 6 shows an alternative embodiment of the heatsink assembly, generally shown at 30.

Figure 17:
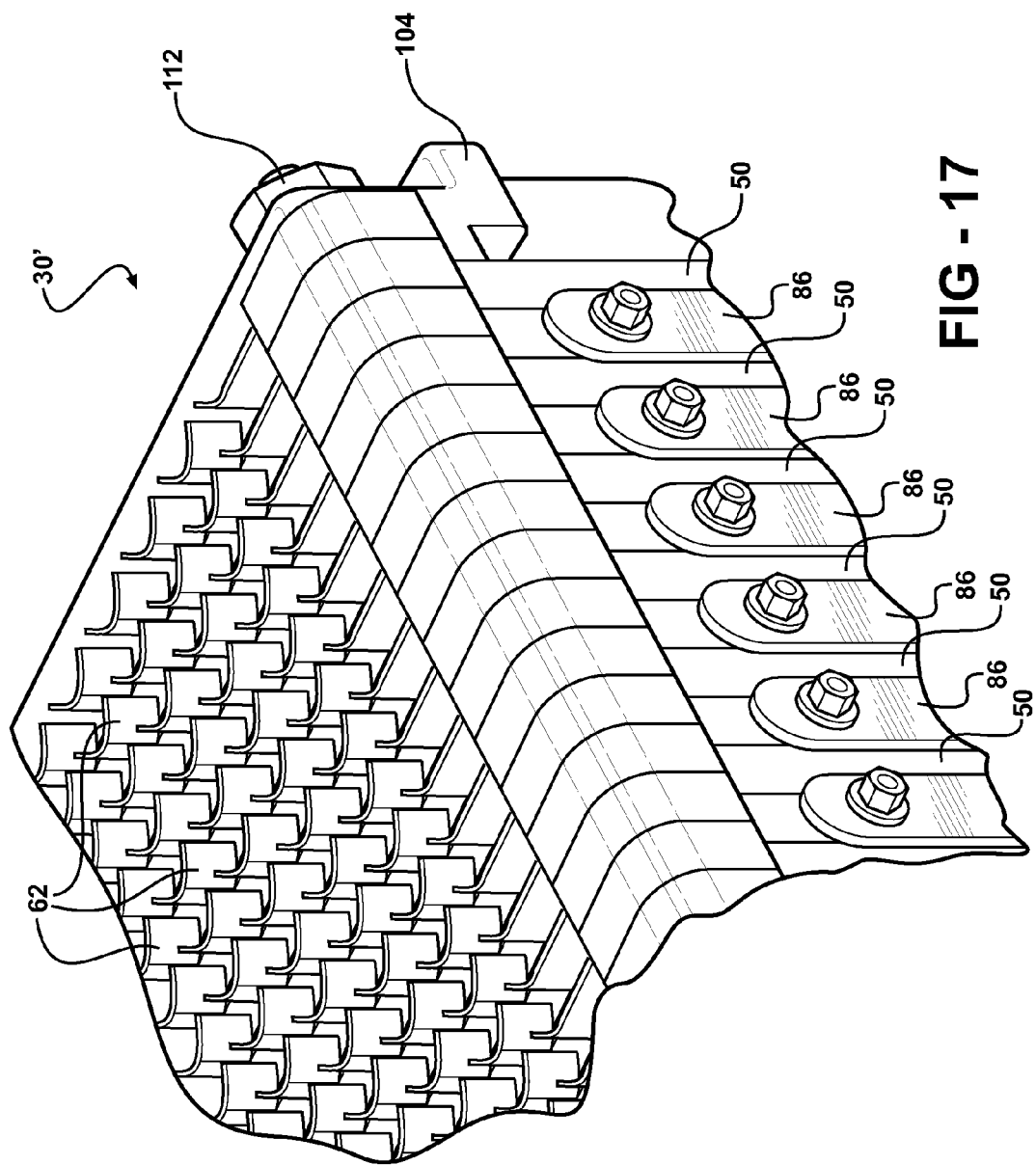
FIG. 17 illustrates a perspective and partial view of an alternative embodiment of the battery module.

Alluding to the above, at least one edge of the thermally conductive plate, sheet, or foil 34 terminates to a fin portion, generally indicated at 60 in FIG. 5, presenting a corrugated configuration 60. FIGS. 6 and 17 show the fin portion 60 presenting tabs 62 being bent to a gate shape extending beyond the plate 32 as viewed from the top edge. FIGS. 7 through 12 show fragmental views of alternative embodiments of the fin portion 60. FIG. 7 shows the fin portion 60 being pleated 64. FIG. 8 shows the fin portion 60 being planar 66. FIG. 9 shows the fin portion 60 having a plurality of slots or holes 68. FIG. 10 shows the fin portion 60 in the form of a bend 70 to provide a thermal interface plane for an external heating or cooling device including but not limited to heater blankets and/or cooling jackets. FIG. 11 shows the fin portion 60 in the form a hook 72. FIG. 12 shows the fin portion 60 presenting the tabs 74 similar to the tabs 62 of FIG. 6, but being bent to a gate shape having a concave surface 76 extending beyond the plate 32 as viewed from the top. Those skilled in the art will appreciate that numerous other shapes of the fin portion 60 can be utilized to provide better surface area for cooling or heating media, such as liquids, solids, or gasses, and the like, are introduced to the fin portion 60 of each thermally conductive plate, sheet, or foil 32 to either cool or to heat the cells 14 of the battery module 12 without limiting the scope of the present invention.

Figure 16:
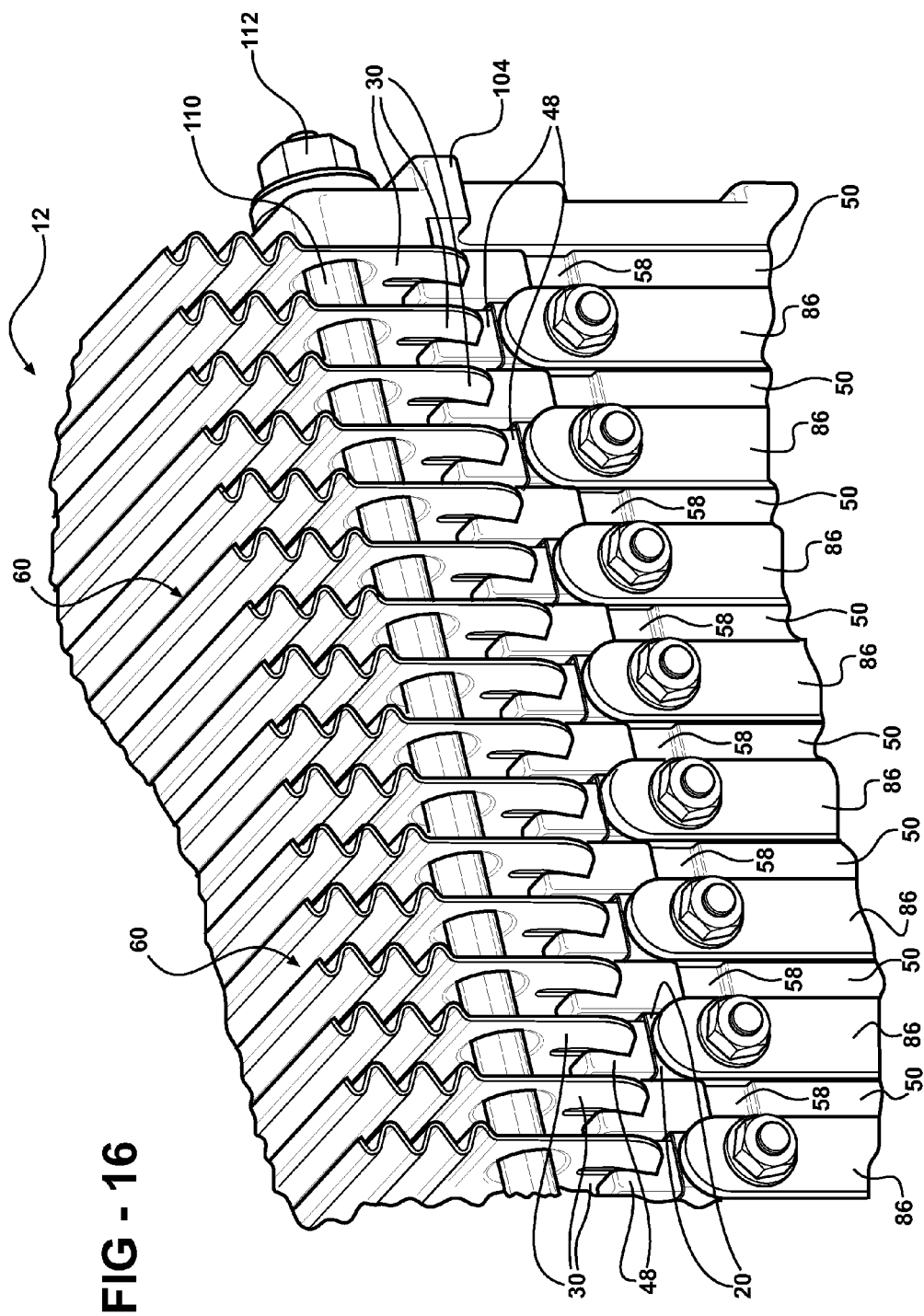
FIG. 16 illustrates a perspective and partial view of the battery module showing the sides of the heatsink assembly and the heatsink thermal transfer edge extending therefrom and also illustrates the bends of the cells engaging the sides of the heatsink assembly being pressurized by a plurality of pressure plates and a rod extending through the heatsink assemblies thereby applying pressure to the cells.

Alluding to the above and as best illustrated in FIGS. 14 through 16, a mechanical connection between the cells 14 and the heatsink assembly 30 is generally shown. As the battery module 12 is being assembled, the heatsink assemblies 30 are oriented in such a fashion wherein the heatsink assemblies 30 are oriented in alternating fashion. In other words, the spacer 48 of one heatsink assembly 30 is alternated with the spacer 50 of another heatsink assembly 30, as best shown in FIG. 16.

Thus, the bend 20 of one of the cells 14 is connected with the bend 22 of another cell 14 with the studs 52 and 54 extending through the respective semicircular openings 24. The bends 20 and 22 of the cells 14 are folded over the studs in an electrical series or parallel configuration. Therefore, the battery module 12, when assembled, defines a positive side, generally indicated at 82, and a negative side, generally indicated at 84.

Figure 18:
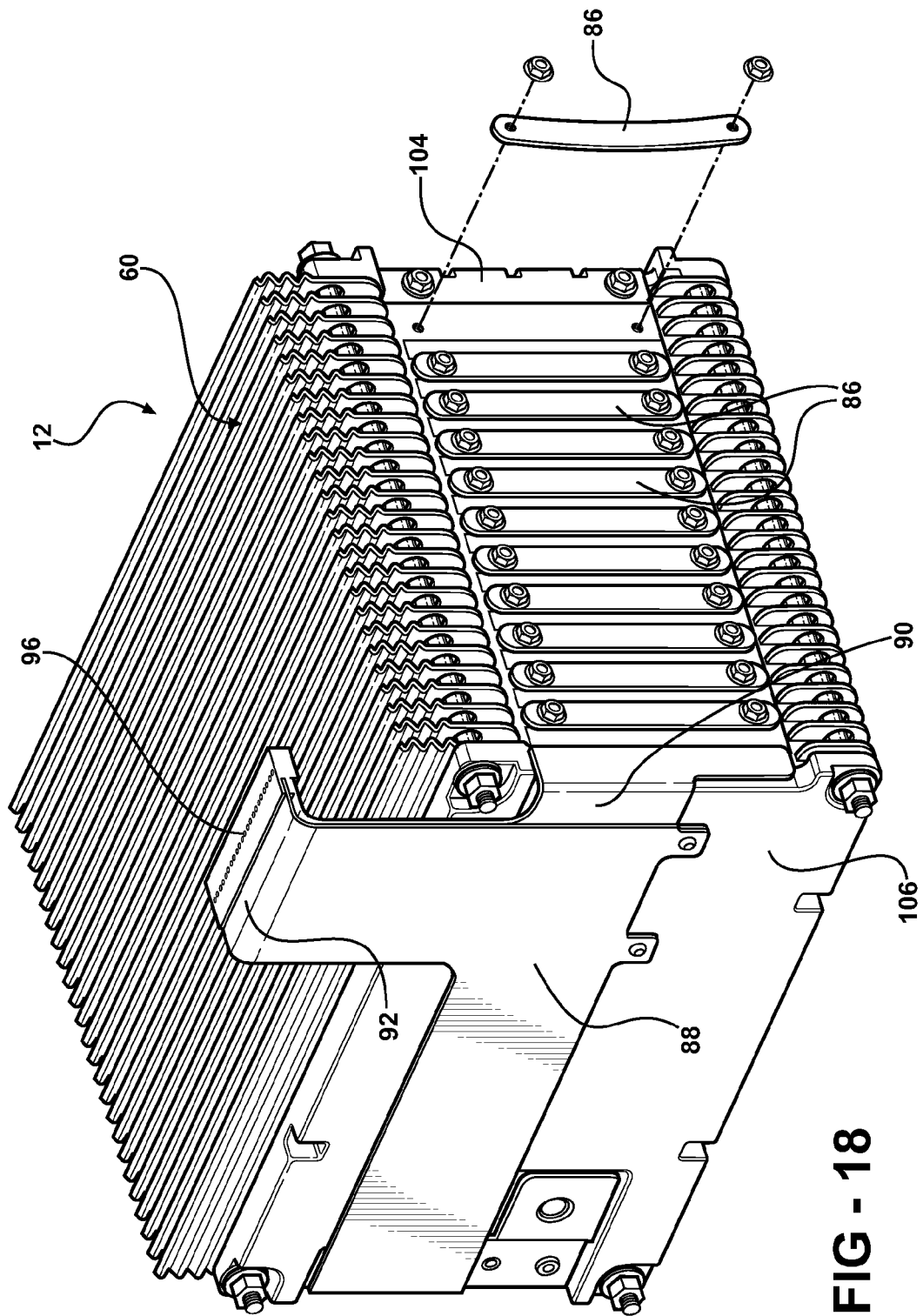
FIG. 18 a perspective view of the battery module having a flexible circuit extending over the bends of the cells and between the pressure plates and extending to a terminal tail portion to provide interconnection to a controller as best shown in FIG. 1.

As shown in FIG. 18, a plurality of compression bars 86 having a crowned or bowed configuration are connected to the spacer 48 to apply uniform pressure across the cell terminal bends 20 and 22 interconnected with one another and to secure a flexible circuit 88 and 90 which are attached about both sides of the module 12. Each flexible circuit 88 and 90 extend to tail portions 92 and 94 terminating into a connection port 96 and 98 to mate with the battery electronic controllers 100 and 102.

Figure 4:
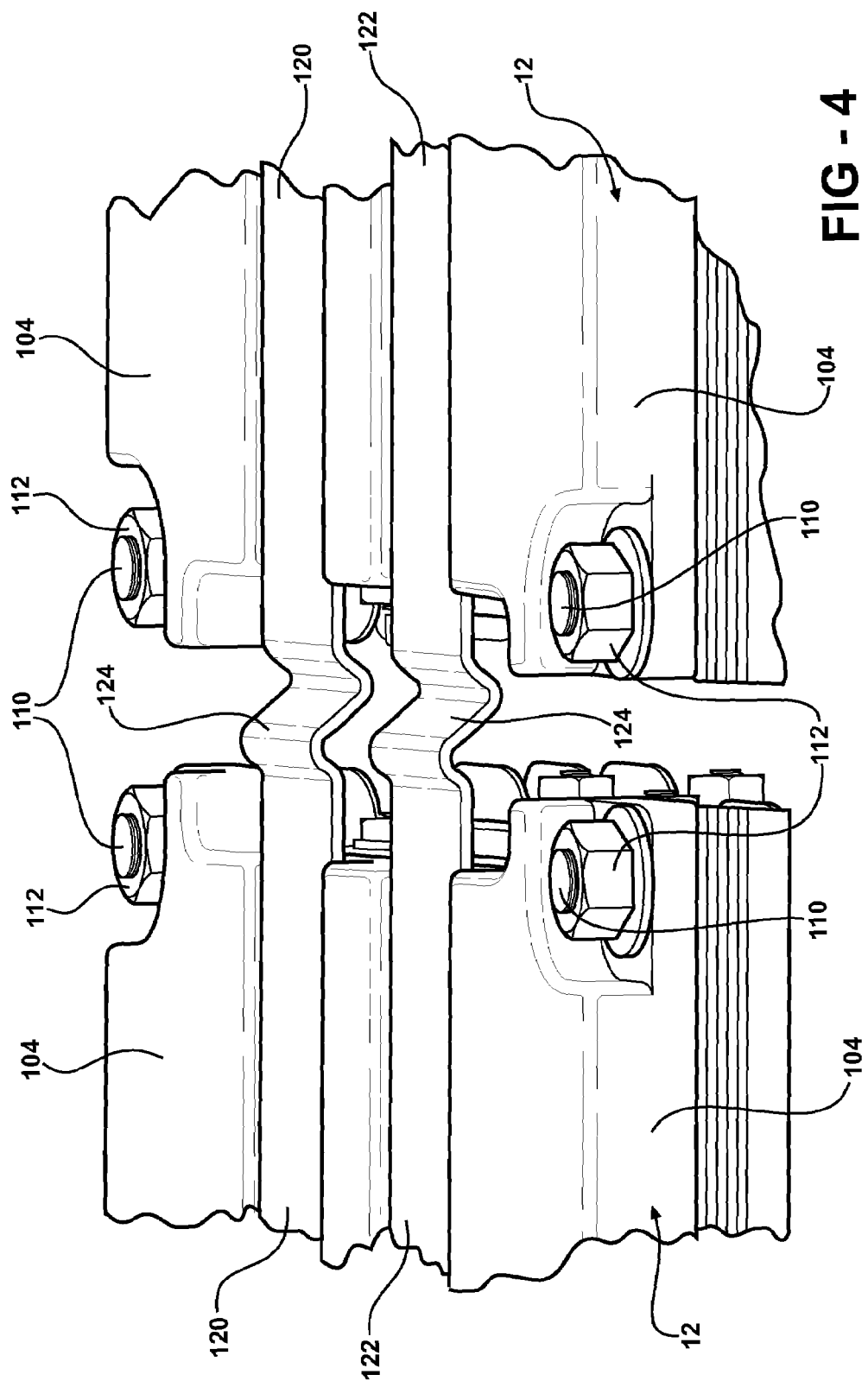
FIG. 4 illustrates a fragmental view of the battery modules interconnected by the bussing device with stress relief members presenting a stress relief element between the battery modules.
Figure 19:
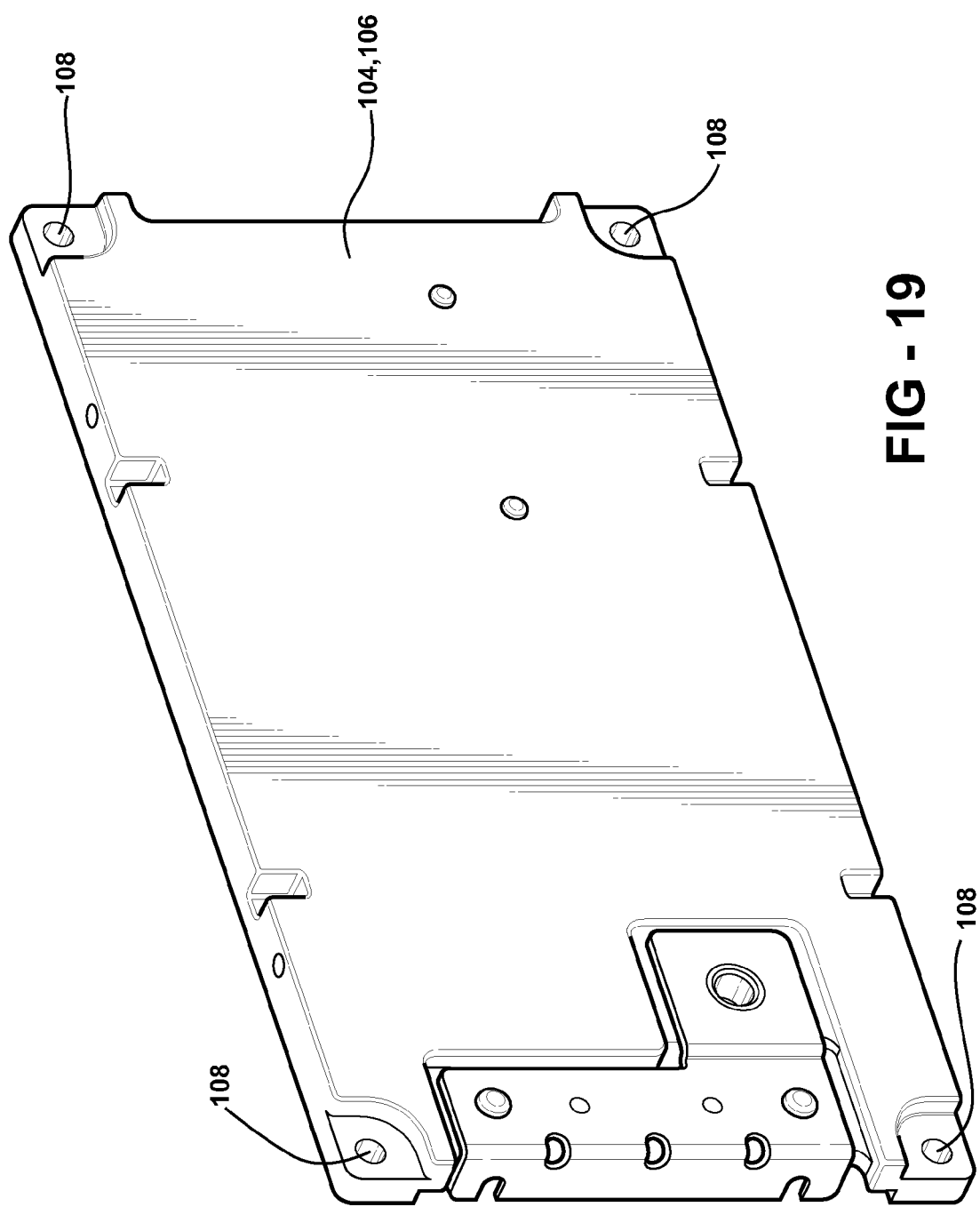
FIG. 19 is a perspective view of a front compression plate assembly.

As best illustrated in FIGS. 4, 15, and 19, a pair of compression plates, generally indicated at 104 and 106, are designed to form terminal walls of each battery module 12. A set of spaced holes 108 are defined in the compression plates 104 and 106 and also heatsink assembly 30 to receive rods 110 extending through the compression plates 104 and 106 and the heatsink assembly 30 and are secured by fasteners 112 to apply pressure to the cells 14 and to place the entire battery module 12 into a compressive state to promote a shorter path length for ionic conduction inside the cells 14 and improve heat transfer to the heatsink assembly 30. Alternatively, each compression plate 104 and 106 present male and female features (not shown) that engage and retain adjacent heatsink assemblies 30. As best illustrated in FIG. 5, a set of conical/countersink features 40 extend from the thermally conductive plate, sheet, or foil 32. To aid in assembly alignment.

Figure 3:
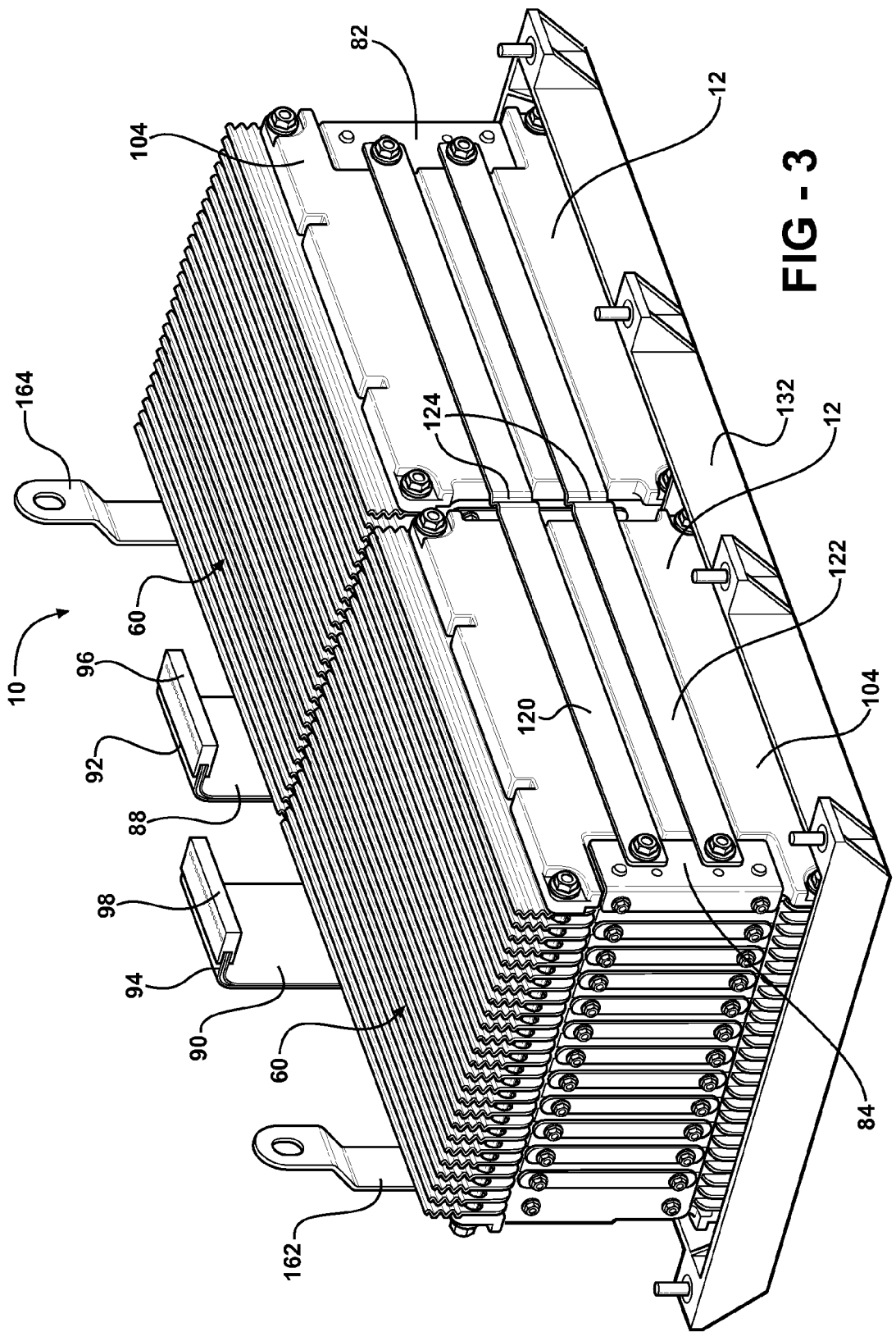
FIG. 3 is another perspective view of the battery pack of FIG. 2 showing the aforementioned two battery modules and a pair of bussing devices with stress relief members disposed on the battery modules thereby interconnecting the same.

As best illustrated in FIGS. 3 and 4, the battery pack 10 includes a pair of conductive members 120 and 122 electrically connecting the battery modules 12 with one another. Each member 120 and 122 is defined by a flat strap, i.e. bar having a stress relief element 124 of an S-shaped configuration disposed on each member 120 and 122 for reducing stress of the battery pack 10 as the vehicle (not shown) is in motion. The number of the members 120 and 122 is not intended to limit the scope of the present invention.

Figure 1:
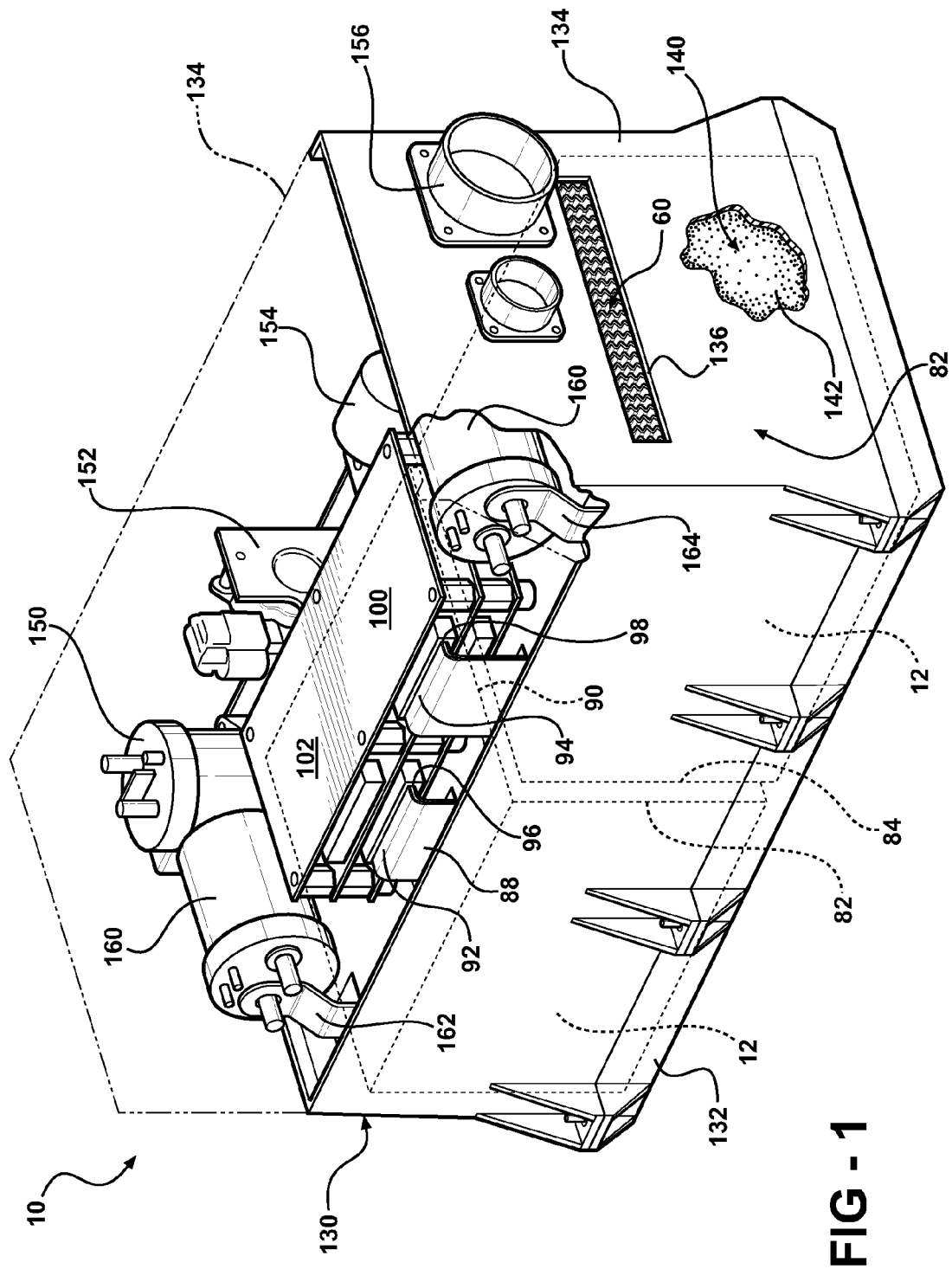
FIG. 1 is a perspective view of a battery pack containing a plurality of modules each have a plurality of cells each interconnected with one another within the battery module, additionally illustrated are battery pack control electronics and external connections.

As best illustrated in FIGS. 1 through 3, the battery pack 10 is assembled, it is then placed into an enclosure or housing, generally indicated at 130 The housing 130 includes a base 132 for supporting the modules 12 and a case 134 to enclose the modules 12. The housing 130 is formed from a polymer material or non-polymer material or combination thereof without limiting the scope of the present invention. The case 134 defines a pair of spaced windows, only one is shown at 136 in FIG. 1 for exposing the fin portions 60 to cooling and/or heating media introduced to the fin portions 60 through the windows 136.

Alternatively, the use of a different fin configuration, as illustrated for example in FIG. 10, and corresponding thermal media i.e. water jacket, would not require the opening 136 on the enclosure 130. As best shown in FIG. 1, a module retention structure partially indicated at 140, formed from a polymer material, such as, for example, foam, injected between the modules 12 and the housing 130. A polyurethane encapsulating solution 142 is used to secure the cells 14 and the aforementioned components within the battery pack 10. The type of foam or encapsulant is not intended to limit the scope of the present invention.

For example, a laminar flow of a mixed two-part encapsulant is poured into the battery pack 10. The abundance of surface area contact and excellent adhesion properties of the encapsulant 142 to the internal components provides a significant mechanical advantage of retention verses traditional methods such as RTV. The expansion of the encapsulant 142 also greatly enhances the structural integrity of the battery module 10 with respect to shock, vibration, and crush loads. The encapsulant 142 extends between each cell 14 and the heat sink assemblies 30 to encapsulate each cell 14 thereby eliminating air gaps between the cells 14 and the heat sink assembly 30.

Heat transfer coefficients are improved due to the elimination of associated insulation layers created by dead air gaps. The encapsulant 142 shot size would be controlled not to allow it to rise over the heat sink fin configuration for air cooled applications as shown in FIGS. 1 through 3. The encapsulate 142 also serves to prevent the electrode stack from shifting inside the cell packaging material during exposure to shock and vibration. The encapsulant 142 also prevents the cell packaging from relaxing over time and allowing the electrolyte to settle into the base of the cell 14 package and thus reducing the cell 14 electrical capacity.

Referring back to FIG. 1, the pack 10 includes a pre-charge circuit 150, a short circuit protection 154, a current sensor 152, a power connector 156, a pair of power contactors 160, and a pair of power buss bars 164 extending from each module 12 and connected to the respective power contactors 160.

Alluding to the above, the battery pack 10 further includes temperature sensors (not shown) disposed within the housing 130 for sensing the temperature of the cells 14. The temperature sensors are electrically connected to the flexible circuit 88 and 90 that receives the temperature from the temperature sensors and routes the data to the battery controller circuits 100 and 102. If the temperature exceeds set safe limits, the battery controller will shut down the entire battery pack 10.

Those skilled in the art may appreciate that the battery pack 10 may include multiple temperature sensors and multiple control circuits. In addition, the arrangement of the cells 14, cooling devices, heaters, if required, the temperature sensors, and the control circuits may be different than as shown in Figures or described. Furthermore, one temperature sensor may be used with multiple control circuits, or each control circuit may have its own temperature sensor. Each may be controlled by the control circuit, or each heater, if required, may be controlled by separate control circuits.

Figure 20:
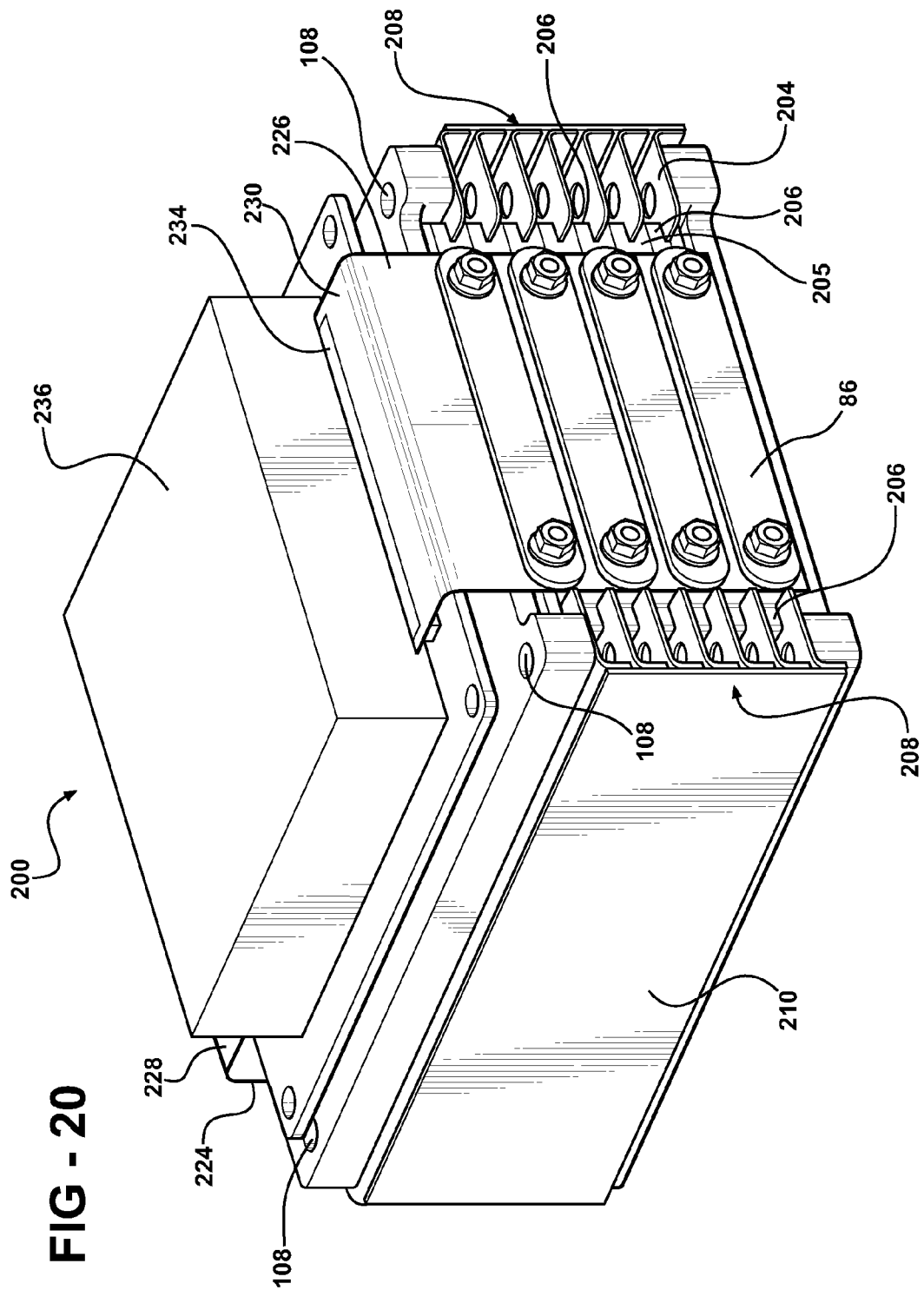
FIG. 20 is an alternative embodiment of the battery module shown in FIG. 1, illustrating a plurality of heating devices.
Figure 21:
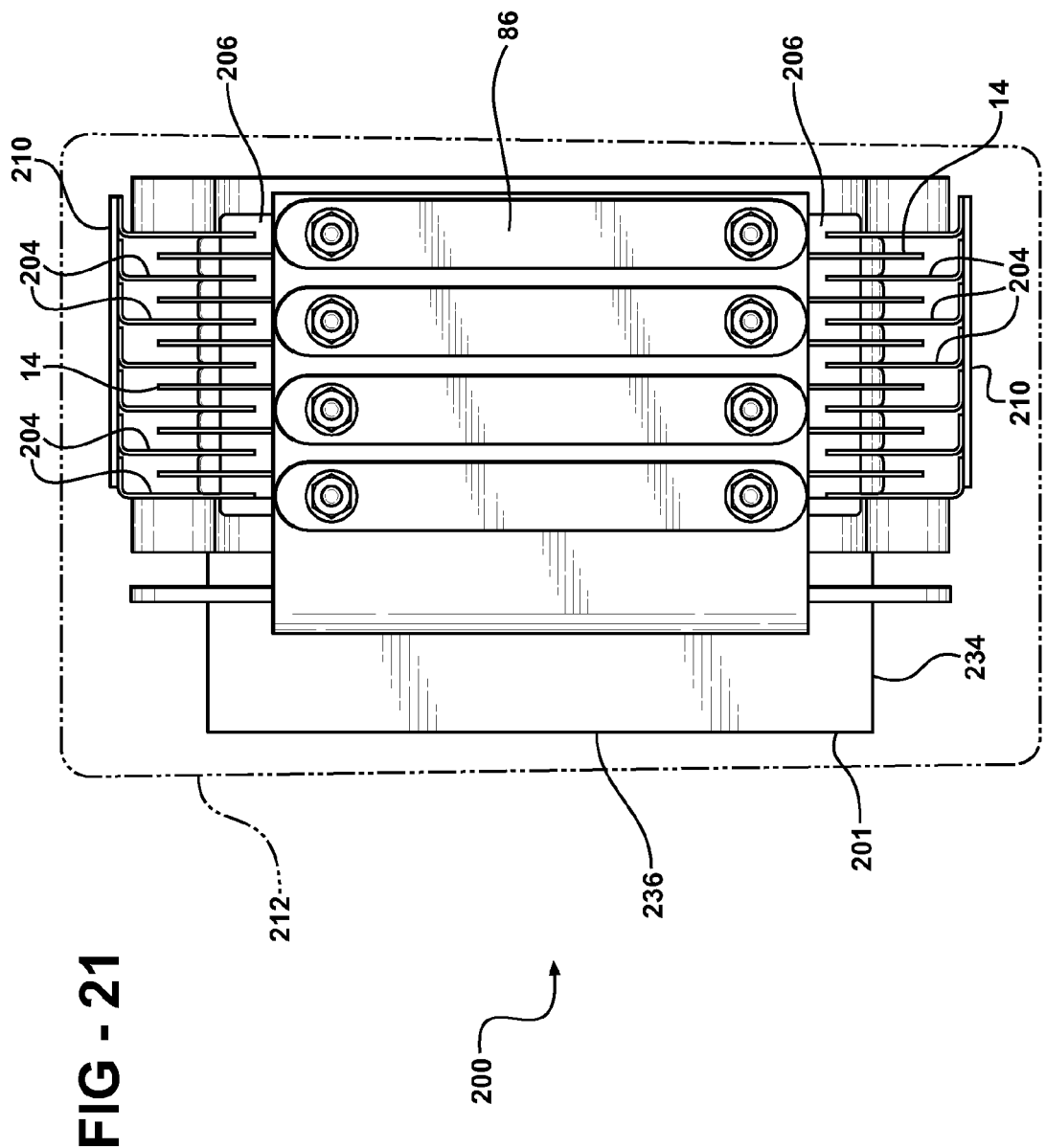
FIG. 21 shows a side view of the battery module of FIG. 20 disposed in a housing.
Figure 22:
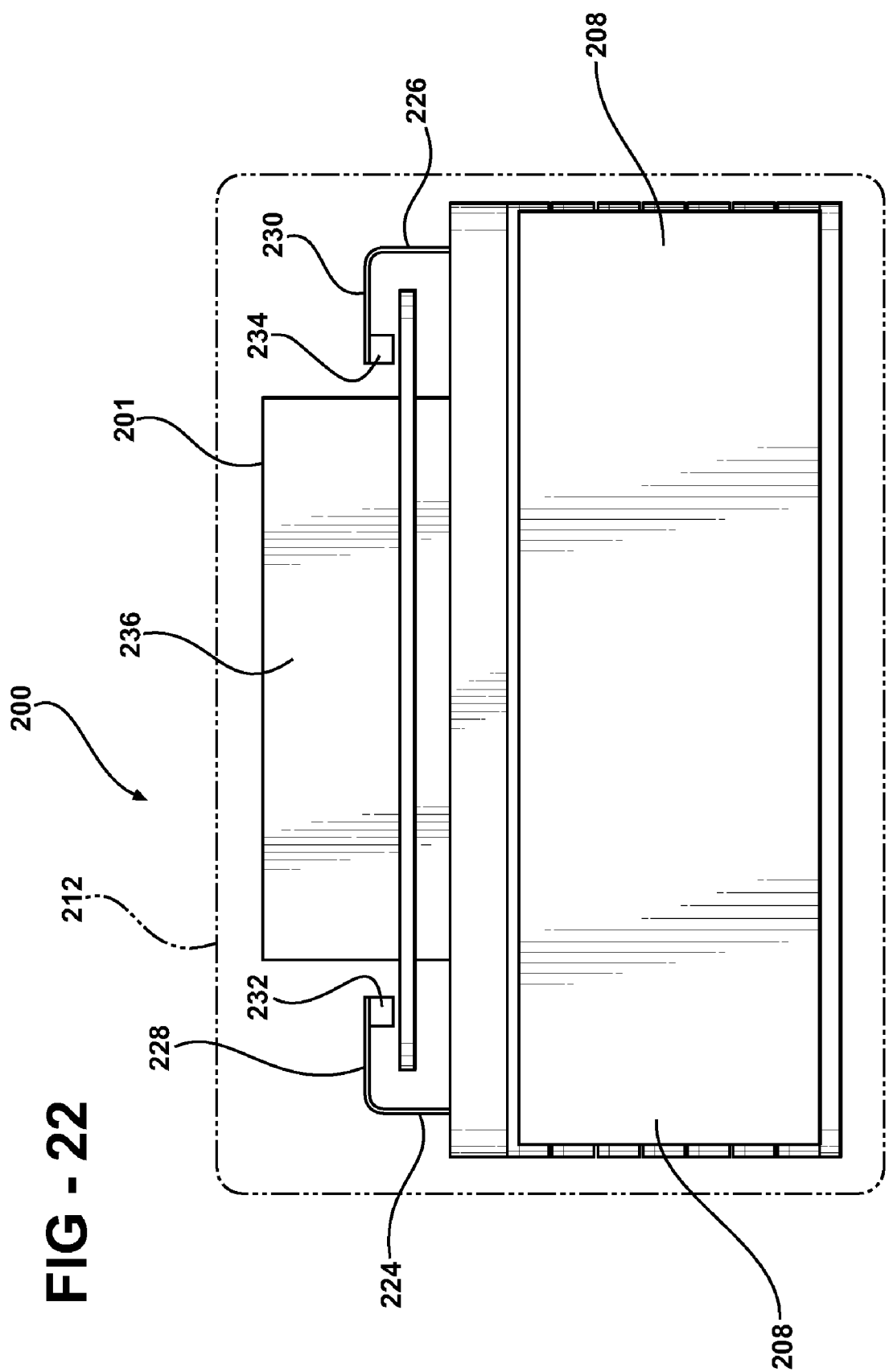
FIG. 22 shows a top view of the battery module of FIG. 20 disposed in the housing.

Alluding to the above, FIGS. 20 through 22 illustrate another alternative embodiment of the present invention, generally shown at 200 having at least one pack, generally indicated at 201. The fin portions 204 extending from the thermal transfer edges of each heat sink assembly 204 present an L-shaped configuration defining an angle of approximately ninety degrees as, best shown in FIG. 21 and earlier in FIG. 10, to form a co-planar interface surface for efficient transfer of thermal energy, generally located at 208. Each co-planar surface 208 supports at least one heater blanket or heater device 210 having a heating element (not shown) for heating the heat sink assembly 204 which in turn heats the cells 14. The heater 210 may be used to heat the cells 14 of the battery module 200 to an optimal operating temperature.

One skilled in the art can appreciate that a lithium ion battery may only operate optimally within an ideal temperature range. When the ambient temperature is below 0° C., the performance of the cells 14 is greatly reduced. Therefore, the heater 210 heats the battery module 200 to the optimal operating temperature, which allows the battery module 200 to be used when the ambient temperature is below 0° C. For instance, with the heater 210, the battery module 200 may be used in ambient temperatures as low as −40° C. Those skilled in the art will appreciate that the temperatures referenced are merely given as an example. Alternatively, the heater 210 may be replaced by a water jacket devices (not shown) for cooling the co-planar interface surface 208 for introducing cooling agent such as for example liquid, gas, or solids and the like to the heat sink assembly 206 thereby cooling the cells 14.

Various types of heaters 210 are known in the art and are within the scope of the subject invention. In a preferred embodiment, the heater 210 may be a resistor that dissipates heat into the enclosure or housing 212.

As shown in FIGS. 20 through 22, a plurality of compression bars 86 having a crowned or bowed configuration are connected to the spacers 205 and 206 to apply uniform pressure across the bends (not shown) of the cells 14 interconnected with one another and to secure a pair of flexible circuits 224 and 226. Each flexible circuit buss 224 and 226 extends to tail portions 228 and 230 terminating into a connection port 232 and 234 to communicate with at least one battery electronic controller 236.

Alluding to the above, the battery module 200 further includes a temperature sensors (not shown) disposed within the enclosure 212 for sensing the temperature of the cells 14. The temperature sensors are electrically connected to the flexible circuit 224 and 226 that receives the temperature from the temperature sensors and routes the data to the battery controller circuit 236. If the temperature exceeds set safe limits, the battery controller will shut down the battery. The battery controller also compares the temperature to a predetermined minimum temperature using a first comparator (not shown). When the temperature in the enclosure 212 falls below the predetermined minimum temperature, a second comparator (not shown) is used to activate a transistor (not shown) that enables the heaters After the enclosure 212 has been heated to a predetermined set-point temperature, the heaters are disabled and stop heating the enclosure 212.

Alluding to the above other advantages of the present invention are shown. The inventive battery packs 10 and 200 have very high energy density characteristics, wherein the high energy density is accomplished by assembling the cells 14, power and data bussing devices, the controllers, thermal management, and retention architecture in the small volume of space thereby improving packaging characteristics and providing a compact product. The battery packs 10 and 200 present excellent retention methods that surrounds and secure the cells 14 and present a cost effective design of the battery module 12. Another advantage of the present invention provides the battery packs 10 and 200 are encapsulated by the potting material, which greatly reduces the potential permeation of liquids into the battery module, or leakage from inside the battery packs 10 and 200 to the outside of the battery packs 10 and 200 thereby preventing reduced product life or premature failures of the battery packs 10 and 200.

The inventive concept of the present invention provides other advantages over the prior art. The battery packs 10 and 200 have efficient packaging characteristics, which provide an excellent retention method that surrounds and secures the cells 14, and the internal electrode stacks within the cells 14. Second advantage of the present invention is unique design of the battery packs 10 and 200 having improved adhesion and surface area contact between battery cells 14 and the heatsink assembly 30 and the encapsulant disposed therebetween and material density thereby providing the battery packs 10 and 200 with the structural integrity being superior to prior art battery packs using traditional retention methods. Still another advantage of the present invention is to provide the battery packs 10 and 200 having a chemical resistant design wherein the internal components of the battery packs 10 and 200 are encapsulated by the potting material which greatly reduces the potential permeation of liquids into the battery pack 10, or leakage from inside the battery packs 10 and 200 to the outside of the battery packs 10 and 200 thereby preventing reduced product life or premature failures of the battery packs 10 and 200.

While the invention has been described as an example embodiment, it will be understood by those skilled in the art that various changes maybe made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A battery assembly for a vehicle having a device for introducing fluid therein thereby affecting temperature of said battery assembly, said battery assembly presenting at least one battery pack comprising:

a plurality of prismatic cells having side edges;

a plurality of heat transfer elements extending between said prismatic cells with each heat transfer element presenting terminal ends and thermal transfer edges with at least one of said thermal transfer edges of extending beyond said edges of said prismatic cell with said heat transfer elements and said prismatic cells being removeably interconnected with one another thereby applying pressure to said prismatic cells; and a mechanical connection between said prismatic cells and said heat transfer elements defined by a first bend extending from one of said side edges of each said prismatic cell and a second bend extending from said side edge of each said prismatic cell extending in an opposite direction from said first bend with said first bend of each of said prismatic cells engaging one of said terminal ends of one of said heat transfer elements and said second bend of each of said prismatic cells engaging said terminal end of another said heat transfer element with each said first bends connecting with one another and each said second bends connecting with one another.

2. A battery assembly as set forth in claim 1 wherein said mechanical connection is further defined by said first bend presenting a negative terminal of said prismatic cell and said second bend presenting a positive terminal of said prismatic cell with said prismatic cell being a lithium ion cell.

3. A battery assembly as set forth in claim 2 wherein each said heat transfer element is further defined by a heat sink assembly having a plate formed from at least one of thermally conductive materials with said plate defining said thermal transfer edges and said terminal ends.

4. A battery assembly as set forth in claim 3 wherein each said plate defines a cut out portion and a spacer engaging said cut out portions.

5. A battery assembly as set forth in claim 4 including brackets each disposed in each of said cut out portions with one of said brackets including at least one stud extending therefrom and the other of said brackets includes at least one concave portion to receive a sensor for sensing temperature of said prismatic cells.

6. A battery assembly as set forth in claim 5 including a pair of terminal plates engaging said heat transfer elements with said prismatic cells disposed therebetween to form said battery pack.

7. A battery assembly as set forth in claim 6 including a power circuit buss connected to each of said negative terminals and said positive terminals and extending to a positive extremity and a negative extremity.

8. A battery assembly as set forth in claim 7 including a plurality of segments connected to said studs extending from said brackets for forcing said power circuit buss to said positive terminals and said negative terminals.

9. A battery assembly as set forth in claim 8 including a housing having a first portion for supporting said battery packs and a second portion for enclosing said battery packs.

10. A battery assembly as set forth in claim 9 wherein said housing and said brackets are formed from a polymeric material.

11. A battery assembly as set forth in claim 3 wherein each of said plates includes a plurality of holes and a plurality of rods extending therethrough to interconnect said heat sink assembly with said prismatic cells disposed between said plates thereby applying pressure to said prismatic cells and retaining said prismatic cells between said plates.

12. A battery assembly as set forth in claim 1 wherein each of said first and second bends presents an L-shaped configuration defining an angle of at least ninety degrees and at least one of circular openings and semi-circular openings defined therein to receive said at least one stud extending from said bracket as said prismatic cells are assembled with said spacers.

13. A battery assembly as set forth in claim 1 wherein at least one of said terminal edges of each said plate presents a corrugated configuration.

14. A battery assembly as set forth in claim 1 wherein at least one of said terminal edges of each said plate presents a hook.

15. A battery assembly as set forth in claim 1 wherein at least one of said terminal edges of each said plate presents a plurality of tabs bent beyond said plate thereby forming a plurality of U-shaped gates.

16. A battery assembly as set forth in claim 1 wherein at least one of said terminal edges of each said plate presents a plurality of holes formed therein.

17. A battery assembly as set forth in claim 1 wherein said battery assembly includes at least one member connecting said battery packs with one another with said at least one member presenting a stress relief element for reducing stress of said battery packs as the vehicle is in motion.

18. A battery assembly as set forth in claim 1 including a foam disposed inside said housing and covering said battery packs to expose said at least one of said terminal edges of said heat transfer elements beyond said foam and exposed by said housing to receive at least one of cooling fluid and heating fluid thereby heating and cooling said prismatic cells.

19. A battery assembly as set forth in claim 1 including at least one of a current sensor, a power contractor, a pair of power bus bars each connected to said battery packs, a battery electronic controller, a power contractor, a short circuit protection, a pre-charge circuit.

20. A method of forming a battery assembly having a plurality of battery packs for a vehicle having a device for introducing fluid therein thereby affecting temperature of the battery assembly, said method comprising the steps of:

placing a plurality of prismatic cells having side edges between a plurality of heat transfer elements extending between the prismatic cells with each heat transfer element presenting terminal edges and terminal sides with at least one of the terminal edges extending beyond the edges of the cell;

removably connecting the heat transfer elements and the prismatic cells with one another to at least increase and decrease the size of the battery pack and to apply pressure to the prismatic cells; and forming a mechanical connection between the prismatic cells and the heat transfer elements by extending a first bend from one of the side edges of each prismatic cell and extending a second bend from another side edge of each prismatic cell in an opposite direction from the first bend;

engaging the first bend of each prismatic cell with one of the terminal ends of one of the heat transfer elements and engaging the second bend of each prismatic cell with the terminal end of another heat transfer element.

21. A method as set forth in claim 20 including the step of forming each heat transfer element in the shape of a plate from at least one of heat insulating material and heat absorbing material with the plate defining the terminal edges and the terminal sides.

22. A method as set forth in claim 20 including the step of forming a cut out portions at each terminal end of the plate.

23. A method as set forth in claim 20 including the step of connecting a bracket to each cut out portion.

24. A method as set forth in claim 20 including the step of extending a pair of studs from one of the brackets.

25. A method as set froth in claim 20 including the step of forming at least one concave portion in another of the brackets to receive a sensor for sensing temperature of the prismatic cells.

26. A method as set forth in claim 20 wherein the step of extending each of the first and second bends is further defined by forming the first and second bends in an L-shaped configuration to define an angle of at least ninety degrees and forming at least one of circular openings and semi-circular openings in each of the first and second bends to receive at least one stud extending from the bracket.

27. A method as set forth in claim 20 including the step of forming a plurality of holes in each heat transfer element to insert a plurality of rods therethrough to interconnect the heat transfer element with the prismatic cells disposed between the heat transfer element to apply pressure to the prismatic cells and to retain the prismatic cells between the heat transfer element.

28. A method as set forth in claim 20 including the step of forming at least one of the terminal edges of each heat transfer element in at least one corrugated, hooked, tabbed, planar configurations.

29. A method as set forth in claim 20 including the step of connecting at least one member to the battery packs with said at least one member presenting a stress relief element to reduce stress of the battery packs as the vehicle is in motion.

30. A method as set forth in claim 20 including the step of connecting a pair of terminal plates to engage the heat transfer element with the prismatic cells disposed therebetween to form the battery pack.

31. A method as set forth in claim 20 including the step of connecting a circuit bus to each of the negative terminals and the positive terminals and extending to a positive extremity and a negative extremity.

32. A method as set forth in claim 20 including the step of connecting a plurality of segments to the studs extending from the brackets to force the circuit bus to the positive terminals and the negative terminals.

33. A method as set forth in claim 20 including the step of forming a housing having a first portion to support at least one of the battery packs and a second portion to enclose at least one of the battery packs.

34. A method as set forth in claim 20 including the step of injecting a foam inside the housing and covering the battery packs to expose at least one of the terminal edges of the heat transfer elements beyond the foam and exposed by the housing to receive at least one of cooling fluid and heating fluid thereby heating and cooling the prismatic cells.

35. A method as set forth in claim 20 including the step of connecting to the battery pack at least one of a current sensor, a power contractor, a pair of power bus bars each connected to said battery packs, a battery electronic controller, a power contractor, a short circuit protection, a pre-charge circuit.

36. A battery assembly for a vehicle having a device for introducing fluid therein thereby affecting temperature of said battery assembly, said battery assembly comprising:

a pair of battery packs each having a plurality of prismatic cells having side edges and a plurality of spacers extending between said prismatic cells with each spacer presenting terminal edges and terminal sides with at least one of said terminal edges of said spacers extending beyond said edges of said prismatic cells with said spacers and said prismatic cells being removeably and mechanically interconnected with one another thereby applying pressure to said prismatic cells;

a mechanical connection defined by a first bend presenting a negative terminal of said prismatic cell and a second bend presenting a positive terminal of said prismatic cell with said prismatic cell being a lithium ion cell, each said spacer is further defined by a plate from at least one of heat insulating material and heat absorbing material with said plate defining said terminal edges and said terminal sides, each terminal end of said spacer is further defined by a cut out portion and a bracket engaging said cut out portion, one of said brackets including at least one stud extending therefrom and the other of said brackets including at least one concave portion to receive a sensor for sensing temperature of said prismatic cells; and at least one member connecting said battery packs with one another with said at least one member presenting a stress relief element for reducing stress of said battery packs as the vehicle is in motion.

37. A battery assembly as set forth in claim 36 wherein said at least one member is further defined by an electrical bussing member connecting said battery packs with one another with said at least one member presenting said stress relief element for reducing stress of said battery packs as the vehicle is in motion.

38. A battery assembly as set forth in claim 36 wherein said at least one member presents a flat member including said stressed relief element disposed therein.

39. A battery assembly as set forth in claim 38 including at least two of said flat members.

40. A battery assembly as set forth in claim 39 wherein said flat member is formed from at least one of metallic and non metallic materials.

41. A battery assembly as set forth in claim 36 wherein each of said first and second bends presents an L-shaped configuration defining an angle of at least ninety degrees and at least one of circular openings and semi-circular openings defined therein to receive said at least one stud extending from said bracket as said prismatic cells are assembled with said spacers.

42. A battery assembly as set forth in claim 36 wherein each of said spacers includes a plurality of holes and a plurality of rods extending therethrough to interconnect said spacers with said prismatic cells disposed between said spacer thereby applying pressure to said prismatic cells and retaining said prismatic cells between said spacers.

43. A battery assembly as set forth in claim 36 including a circuit bus connected to each of said negative terminals and said positive terminals and extending to a positive extremity and a negative extremity.

44. A battery assembly as set forth in claim 36 including a housing having a first portion for supporting said battery packs and a second portion for enclosing said battery packs and a foam disposed inside said housing and covering said battery packs to expose said at least one of said terminal edges of said spacers beyond said foam and exposed by said housing to receive at least one of cooling fluid and heating fluid thereby heating and cooling said prismatic cells.

45. A battery assembly as set forth in claim 36 including at least one of a current sensor, a power contractor, a pair of power bus bars each connected to said battery packs, a battery electronic controller, a power contractor, a short circuit protection, a pre-charge circuit.

46. A battery assembly for a vehicle having a device for introducing fluid therein thereby affecting temperature of said battery assembly, said battery assembly comprising:
- at least one battery pack;
- a plurality of prismatic lithium cells of said at least one battery pack, each prismatic lithium cell having side edges and first and second bends presents an L-shaped configuration defining an angle of at least ninety degrees and extending from said side edges in opposite directions and at least one of circular openings and semi-circular openings defined in each of said first and second bends;
- a plurality of spacers extending between said prismatic lithium cells with each spacer presenting terminal ends and terminal edges with at least one of said terminal edges of said spacers extending beyond said side edges of said prismatic lithium cell with said spacers and said prismatic lithium cells being removable interconnected with one another thereby applying pressure to said prismatic lithium cells;
- each said spacer defined by a plate from at least one of heat insulating material and heat absorbing material with said plate defining said terminal edges and said terminal sides wherein at least one of said terminal edges of said spacer presents a corrugated configuration wherein at least one of said terminal edges of said spacer presents a hook;
- a cut out portion defined in each terminal end of said spacer;
- a pair bracket engaging said cut out portions of each said spacer wherein one of said brackets includes at least one stud extending therefrom and the other of said brackets includes at least one concave portion to receive a sensor for sensing temperature of said prismatic lithium cells;
- each of said spacers includes a plurality of holes and a plurality of rods extending therethrough to interconnect said spacers with said prismatic cells disposed between said spacer thereby applying pressure to said prismatic cells and retaining said prismatic cells between said spacers;
- at least one stud extending from at least one of said brackets to engage said at least one of said receive said at least one of circular openings and semi-circular openings defined in each of said first and second bends as said prismatic lithium cells are assembled with said spacers whereby one of said bends extending from one of said side edges of each said prismatic lithium cell and another bend extending from another side edge of each said prismatic lithium cell in an opposite direction with said bend of each of said prismatic lithium cells engaging one of said terminal ends of one of said spacers and said another bends of each of said prismatic lithium cells engaging terminal end of another said spacer;
- at least one member connecting said battery packs with one another with said at least one member presenting a stress relief element for reducing stress of said battery packs as the vehicle is in motion;
- a pair of terminal plates engaging said spacers with said prismatic cells disposed therebetween to form said battery pack;
- a circuit bus connected to each of said negative terminals and said positive terminals and extending to a positive extremity and a negative extremity;
- a plurality of segments connected to said studs extending from said brackets for forcing said circuit bus to said positive terminals and said negative terminals;
- a housing formed from a polymeric material, said housing having a first portion for supporting said battery packs and a second portion for enclosing said battery packs;
- a foam disposed inside said housing and covering said battery packs to expose said at least one of said terminal edges of said spacers beyond said foam and exposed by said housing to receive at least one of cooling fluid and heating fluid thereby heating and cooling said prismatic cells; and
- at least one of a current sensor, a power contractor, a pair of power bus bars each connected to said battery packs, a battery electronic controller, a power contractor, a short circuit protection, a pre-charge circuit presenting operative communication with one another and said prismatic cells and said spacers.

* * * * *